(12) United States Patent
Sashihara

(10) Patent No.: US 12,482,223 B2
(45) Date of Patent: Nov. 25, 2025

(54) INFORMATION PROCESSING SYSTEM, INFORMATION PROCESSING APPARATUS, INFORMATION PROCESSING METHOD, AND RECORDING MEDIUM

(71) Applicant: NEC Corporation, Tokyo (JP)

(72) Inventor: Toshiyuki Sashihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/775,617

(22) PCT Filed: Sep. 3, 2021

(86) PCT No.: PCT/JP2021/032448
§ 371 (c)(1),
(2) Date: Mar. 9, 2023

(87) PCT Pub. No.: WO2023/032157
PCT Pub. Date: Mar. 9, 2023

(65) Prior Publication Data
US 2024/0153237 A1    May 9, 2024

(51) Int. Cl.
*G06K 9/00* (2022.01)
*G06V 10/74* (2022.01)

(52) U.S. Cl.
CPC .................... *G06V 10/761* (2022.01)

(58) Field of Classification Search
None
See application file for complete search history.

(56) References Cited

U.S. PATENT DOCUMENTS

| | | | |
|---|---|---|---|
| 2007/0122006 A1 | 5/2007 | Taniguchi | |
| 2009/0060295 A1 | 3/2009 | Inque et al. | |
| 2013/0136320 A1 | 5/2013 | Nishiguchi et al. | |
| 2020/0104577 A1* | 4/2020 | Uchida | G06V 40/166 |

FOREIGN PATENT DOCUMENTS

| | | |
|---|---|---|
| JP | 2004-240741 A | 8/2004 |
| JP | 2007-080184 A | 3/2007 |
| JP | 2007-249588 A | 9/2007 |
| JP | 2012-160001 A | 8/2012 |
| JP | 2013-114304 A | 6/2013 |
| JP | 2016-192070 A | 11/2016 |
| JP | 6432634 B2 | 12/2018 |
| JP | 2019-028959 A | 2/2019 |

OTHER PUBLICATIONS

International Search Report for PCT Application No. PCT/JP2021/032448, mailed on Nov. 22, 2021.

* cited by examiner

*Primary Examiner* — SJ Park
(74) *Attorney, Agent, or Firm* — Sughrue Mion, PLLC

(57) ABSTRACT

An information processing system (10) comprises: an acquisition unit (110) that acquires an image of a target; a registration unit (120) that registers the image of the target and a registration condition including a condition relating to each wearing item of the target in association with each other; and an output unit (130) that outputs information relating to, within the registration conditions to be registered with respect to the target, the registration condition that is unregistered in the registration unit. According to such an information processing system, it is possible to register an image corresponding to each of a plurality of conditions to increase the robustness of authentication.

8 Claims, 28 Drawing Sheets

FIG.5

| REGISTRATION CONDITION | REGISTRATION STATUS |
|---|---|
| NO WEARING ITEMS | ○ |
| WITH EYEGLASSES | ○ |
| WITH MASK | × |
| WITH EYEGLASSES AND MASK | × |

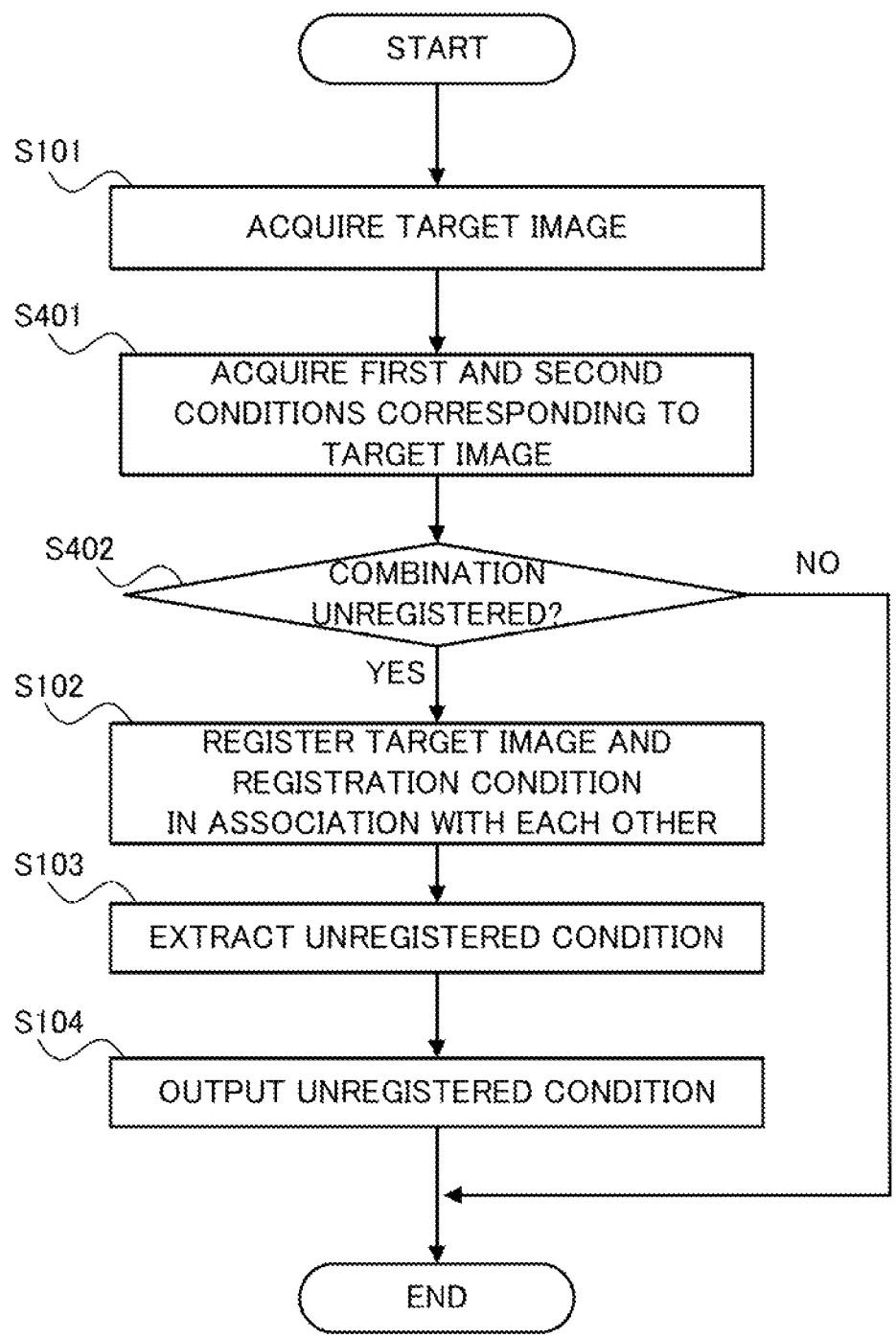

FIG.16

| FIRST CONDITION (WEARING ITEM) | SECOND CONDITION (SIGHT DIRECTION) | REGISTRATION STATUS |
|---|---|---|
| NO WEARING ITEMS | CAMERA FRONT | ○ |
| WITH EYEGLASSES | CAMERA FRONT | ○ |
| WITH MASK | CAMERA FRONT | × |
| WITH EYEGLASSES AND MASK | CAMERA FRONT | × |
| NO WEARING ITEMS | UPPER DIRECTION | ○ |
| WITH EYEGLASSES | UPPER DIRECTION | × |
| WITH MASK | UPPER DIRECTION | ○ |
| WITH EYEGLASSES AND MASK | UPPER DIRECTION | × |
| NO WEARING ITEMS | RIGHT DIRECTION | ○ |
| WITH EYEGLASSES | RIGHT DIRECTION | × |
| WITH MASK | RIGHT DIRECTION | × |
| WITH EYEGLASSES AND MASK | RIGHT DIRECTION | × |

FIG.19

| PRIORITY ORDER | FACE IMAGE | IRIS IMAGE |
|---|---|---|
| 1 | MASK | EYEGLASSES |
| 2 | EYEGLASSES | SUNGLASSES |
| 3 | HAT | CONTACT LENSES |
| ⋮ | ⋮ | ⋮ |

FIG.28

| TARGET MOTION | REQUIRED TIME |
|---|---|
| PUTTING EYEGRALLSES ON | 5 seconds |
| REMOVING EYEGLASSES | 6 seconds |
| PUTTING MASK ON | 8 seconds |
| REMOVING MASK | 10 seconds |

INFORMATION PROCESSING SYSTEM, INFORMATION PROCESSING APPARATUS, INFORMATION PROCESSING METHOD, AND RECORDING MEDIUM

This application is a National Stage Entry of PCT/JP2021/032448 filed on Sep. 3, 2021, the contents of all of which are incorporated herein by reference, in their entirety.

TECHNICAL FIELD

The disclosures relate to technical fields of information processing systems, information processing apparatus, information processing methods, and recording medium.

BACKGROUND ART

As a system of this type, there is known a system in which images to be used for biometric authentication such as face authentication or the like are registered. For example, Patent Document 1 discloses a technique in which a face image and a combinable part (such as an eyeglasses part) are combined and registered as a composite image to be used for facial matching. Patent Document 2 discloses a technique for determining the presence or absence of glasses in a registered face image and changing a threshold for matching according to the determination result. Patent Document 3 discloses a technique in which, when a registered face and an unregistered face are extracted from one image for matching, the image of the unregistered face is picked up and additionally registered. In Patent Document 4, disclosed is a technique that when the matching rate of a non-matching image that does not match the features of the master is equal to or greater than a threshold value, image data of the non-matching image is linked to the master already registered. Patent Document 5 discloses a technique for registering a face image when the face image satisfies a predetermined condition (the size of the contour, the face direction, the number of pixels of gradation equal to or greater than the threshold, etc.).

CITATION LIST

Patent Document

Patent Document 1: JP 2004-240741 A
Patent Document 2: JP 2012-160001 A
Patent Document 3: JP 2013-114304 A
Patent Document 4: JP 6432634 B2
Patent Document 5: JP 2019-028959 A

SUMMARY

Technical Problem

This disclosure aims to improve the techniques disclosed in the prior art documents.

Solution to Problem

One aspect of the information processing system of this disclosure comprises: an acquisition unit that acquires an image of a target; a registration unit that registers the image of the target and a registration condition including a condition relating to each wearing item of the target in association with each other; and an output unit that outputs information relating to, within the registration conditions to be registered with respect to the target, the registration condition that is unregistered in the registration unit.

One aspect of the information processing apparatus of this disclosure comprises an acquisition unit that acquires an image of a target; a registration unit that registers the image of the target and a registration condition including a condition relating to each wearing item of the target in association with each other; and an output unit that outputs information relating to, within the registration conditions to be registered with respect to the target, the registration condition that is unregistered in the registration unit.

One aspect of the information processing method of this disclosure is an information processing method to be implemented by at least one computer, comprising: acquiring an image of a target; registering the image of the target and a registration condition including a condition relating to each wearing item of the target in association with each other; and outputting information relating to, within the registration conditions to be registered with respect to the target, the registration condition that is unregistered in the registration unit.

One aspect of the recording medium of this disclosure stores a computer program that allows at least one computer to implement an information processing method, the information processing method comprising: acquiring an image of a target; registering the image of the target and a registration condition including a condition relating to each wearing item of the target in association with each other; and outputting information relating to, within the registration conditions to be registered with respect to the target, the registration condition that is unregistered in the registration unit.

BRIEF DESCRIPTION OF DRAWINGS

FIG. 5 is a table showing an example of unregistered conditions and registered conditions outputted by an information processing system according to the first example embodiment.

FIG. 15 is a flowchart showing a flow of operation by an information processing system according to the fourth example embodiment.

FIG. 16 is a table showing an example of a combination of a first condition and a second condition and a registration status thereof in an information processing system according to the fourth example embodiment.

FIG. 19 is a table showing an example of setting priority in an information processing system according to the fifth example embodiment.

FIG. 28 is a table showing a setting example of required time relating to each motion of target in an information processing system according to the seventh example embodiment.

DESCRIPTION OF EXAMPLE EMBODIMENTS

Hereinafter, example embodiments of the information processing system, the information processing method, and the recording medium will be described with reference to the drawings.

First Example Embodiment

The information processing system according to a first example embodiment will be described with reference to FIGS. 1 to 5.

(Hardware Configuration)

Figure 1:
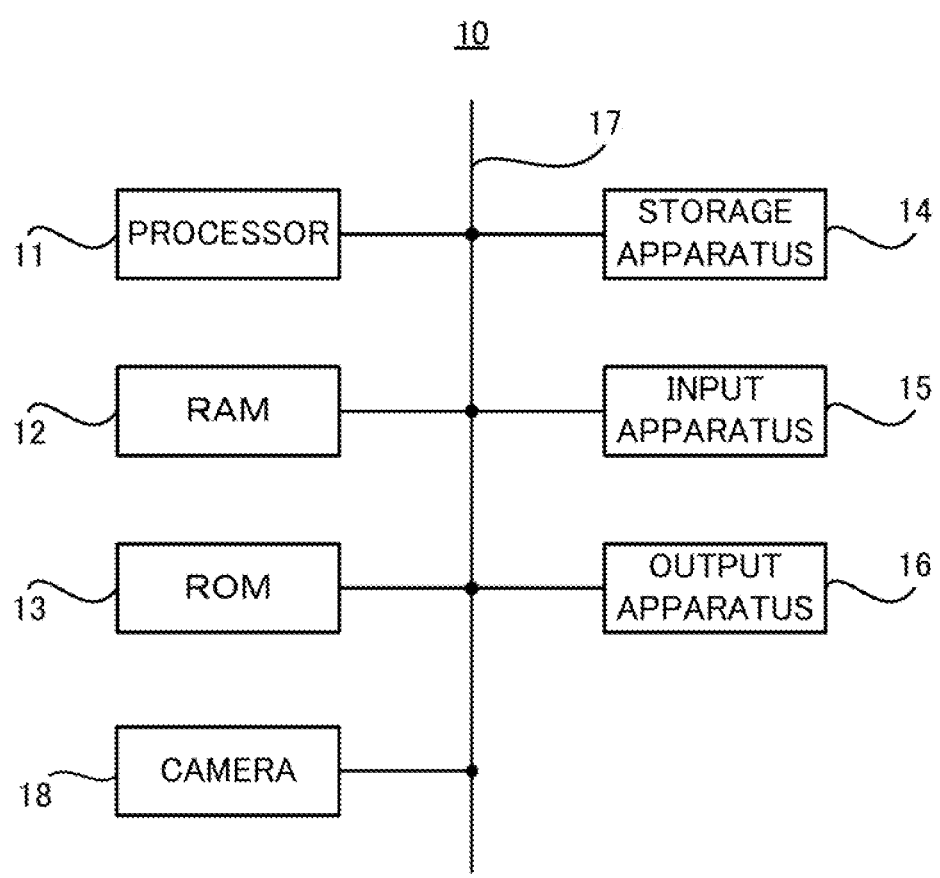
FIG. 1 is a block diagram showing a hardware configuration of an information processing system according to the first example embodiment.

First, a hardware configuration of an information processing system according to the first example embodiment will be described with reference to FIG. 1. FIG. 1 is a block diagram showing the hardware configuration of the information processing system according to the first example embodiment.

As shown in FIG. 1, the information processing system 10 according to the first example embodiment comprises a processor 11, a RAM (Random Access Memory) 12, a ROM (Read Only Memory) 13, and a storage apparatus 14. The information processing system 10 may further comprise an input apparatus 15 and an output apparatus 16. The information processing system 10 may also comprise a camera 18. The processor 11 described above, the RAM12, the ROM13, the storage apparatus 14, the input apparatus 15, the output apparatus 16, and the camera 18 are connected with each other via a data bus 17.

The Processor 11 reads a computer program. For example, the processor 11 is configured to read a computer program stored in at least one of the RAM12, the ROM13 and the storage apparatus 14. Alternatively, the processor 11 may read a computer program stored in a computer readable recording medium using a recording medium reading apparatus (not illustrated). The processor 11 may acquire (i.e., read) a computer program from an apparatus (not illustrated) located external to the information processing system 10 via a network interface. The processor 11 controls the RAM12, the storage apparatus 14, the input apparatus 15, and the output apparatus 16 by implementing the computer program read. In particular, in the present example embodiment, when the computer program read by the processor 11 is implemented, realized in the processor 11 are a functional block for acquiring and registering an image and a functional block for outputting an unregistered condition.

The processor 11 may be configured as, for example, a CPU (Central Processing Unit), a GPU (Graphics Processing Unit), FPGA (field-programmable gate array), a DSP (Demand-Side Platform), and a ASIC (Application Specific Integrated Circuit). The processor 11 may be configured as one of these, or may be configured to use two or more of them in parallel.

The RAM12 temporarily stores the computer program which the processor 11 implements. The RAM12 temporarily stores data which the processor 11 temporarily uses when being implementing a computer program. The RAM12 may be, for example, a D-RAM (Dynamic RAM).

The ROM13 stores the computer program to be implemented by the processor 11. The ROM13 may further store fixed data. The ROM13 may be, for example, a P-ROM (Programmable ROM).

The storage apparatus 14 stores data that the information processing system 10 should preserve over a long period of time. The storage apparatus 14 may operate as a temporary storage apparatus of the processor 11. The storage apparatus 14 may include, for example, at least one of a hard disk apparatus, a magnet-optical disk apparatus, an SSD (Solid State Drive), and a disk array apparatus.

The input apparatus 15 is an apparatus that receives input instructions from a user of the information processing system 10. The input apparatus 15 may include, for example, at least one of a keyboard, a mouse, and a touch panel. The input apparatus 15 may be configured as a portable terminal, such as a smartphone or tablet.

The output apparatus 16 is an apparatus that outputs information relating to the information processing system 10 to the outside. For example, the output apparatus 16 may be a display apparatus (e.g., a display) capable of displaying information relating to the information processing system 10. Further, the output apparatus 16 may be a speaker or the like capable of audio output relating to the information processing system 10. The output apparatus 16 may be configured as a portable terminal, such as a smartphone or tablet.

The camera 18 is a camera installed in a position capable of imaging target's image (e.g., an image including the face of the target). The camera 18 may be a camera mounted on a terminal (e.g., a smartphone) which the target owns. The target here is not limited to a human, but may include: an animal such as a dog, a snake and the like; and a robot and the like. The camera 20 may be a camera for taking still images or may be a camera for taking videos. The camera 20 may be configured as a visible light camera or a near infrared camera.

In FIG. 1, an example of the information processing system 10 configured to include a plurality of apparatuses has been exemplified, but all or part of their functions may be realized by one apparatus (the information processing apparatus). The information processing apparatus may be configured with, for example, only the processor 11, the RAM12, and the ROM13 described above. With respect to the other components ((i.e., the storage apparatus 14, the input apparatus 15, the output apparatus 16, and the camera 18), an external apparatus connected to, for example, the information processing apparatus may comprise them. In addition, the information processing apparatus may realize a part of the arithmetic function by an external apparatus (e.g., an external server, or a cloud system, etc.).

(Functional Configuration)

Figure 2:
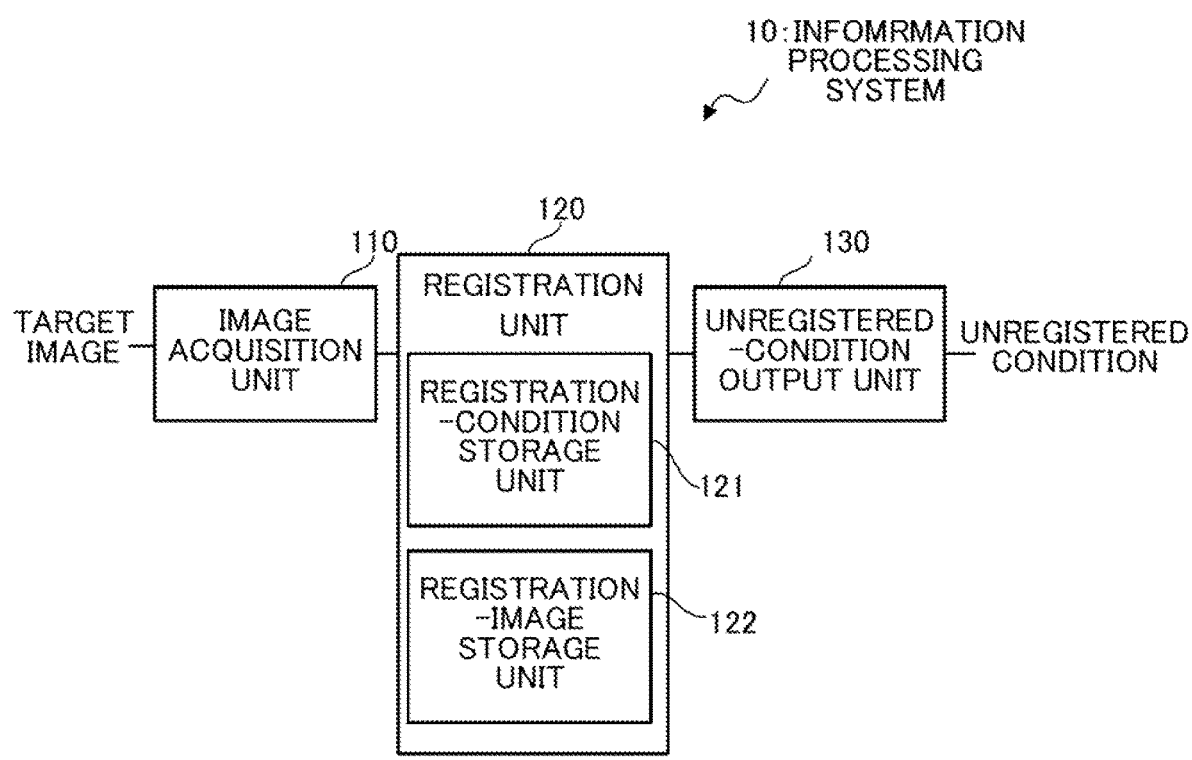
FIG. 2 is a block diagram showing a functional configuration of an information processing system according to the first example embodiment.

Next, a functional configuration of the information processing system 10 according to the first example embodiment will be described with reference to FIG. 2. FIG. 2 is a block diagram showing a functional configuration of the information processing system according to the first example embodiment.

As shown in FIG. 2, the information processing system 10 according to the first example embodiment is configured to comprise an image acquisition unit 110, a registration unit 120, and an unregistered-condition output unit 130 as components for realizing the functions of the information processing system 10. Each of the image acquisition unit 110, the registration unit 120, and the unregistered-condition output unit 130 may be a processing block implemented, for example, by the processor 11 described above (see FIG. 1). Further, the registration unit 120 may realize by the storage apparatus 14, the function thereof for storing information to be registered.

The image acquisition unit 110 is configured so as to acquire an image of a target. The image acquisition unit 110 may be configured to acquire the image of the target taken by the camera 18 directly, or may be configured to acquire the image stored in the storage or the like. In addition, the image acquisition unit 110 may be configured to implement various processing on the acquired image of the target. For example, the image acquisition unit 110 may be configured so as to perform processing for detecting from the image, a part (e.g., the face, the iris, or the like) of a living body of the target. In addition, the image acquisition unit 110 may be configured so as to perform processing for detecting a wearing item worn by the target.

The registration unit 120 is configured so as to register the image of target acquired by the image acquisition unit 110 and a registration condition that includes a condition relating to the wearing item of the target in association with each other. That is, the registration unit 120 is configured so as to register the image of target in association with the condition corresponding to the image (e.g., the condition relating to the wearing item worn by the target in the image). The registration condition may include a plurality of conditions. For example, the registration condition may include, in addition to the conditions relating to the wearing item described above, conditions relating to the line of sight and the facial direction with respect to the target, and conditions relating to the environment when the image is taken (e.g., conditions relating to brightness, resolution, etc.). The registration unit 120 comprises a registration-condition storage unit 121 and a registration-image storage unit 122 for storing the image of target and the registration condition in association with each other.

The Registration condition storage unit 121 is configured so as to store the registration conditions to be registered in association with the image of target. According to the use application or the like of the image of target, the registration conditions may be set in advance to be stored in the registration-condition storage unit 121. For example, when performing a facial authentication using the image of target, the registration conditions each may be set as a facial-authentication registration condition which is a condition relating to a wearing item affecting the facial authentication. As specific examples of the wearing item that could affect the facial authentication, there are eyeglasses, a mask, a hat, and the like. Also, when performing an iris authentication using the image of target, the registration conditions each may be set as an iris-authentication registration condition, which is a condition relating to a wearing item affecting the iris authentication. Thus, the registration condition may be set for each modal processing (e.g., a portion of a living body) that is used for performing authentication. As specific examples of the wearing item affecting the iris authentication, there are eyeglasses, sunglasses, contact lenses, false eyelashes, and the like.

The registration-image storage unit 122 is configured so as to store the image of target and the registration condition in association with each other. In the following, the image of target stored in the registration-image storage unit 122 is appropriately referred to as the "registered image". The registered image may be used, for example, for the authentication processing using images. The registered image may be used, for example, to check a newly acquired image from the target when the facial authentication or iris authentication for the target is performed. In the present example embodiment, in particular, the registration-image storage unit 122 stores a plurality of types of registered images corresponding to the registration conditions. These different types of registered images may be used as appropriate depending on the status of authentication target. For example, if a target is wearing goggles during the authentication processing, checking may be performed using the registered image stored in association with the registration condition "goggled".

The registration unit 120 may have a function of determining whether or not the image of target acquired by the image acquisition unit 110 is problematic if registered. In this instance, the registration unit 120 may determine whether or not the image is problematic, for example, based on the imaging qualities of image. Specifically, if the imaging quality is sufficiently high, the registration unit 120 may determine that the image is problem-free one even if registered. Conversely, if the imaging quality is poor, the registration unit 120 may determine that the image is the problematic image. The determination criteria here may be set in advance according to the use application or the like of the image of target. The registration unit 120 may be configured to register only the image that is determined to be problem-free even if registered, as a result of the determination described above.

The unregistered-condition output unit 130 is configured so as to output information relating to the registration condition that is unregistered in the registration unit 120 (hereinafter, appropriately referred to as the "unregistered condition"), within the registration conditions to be registered for the target. The unregistered-condition output unit 130 may have a function of extracting the unregistered condition based on information stored in the registration-image storage unit 122. That is, the unregistered-condition output unit 130 may have a function of identifying which conditions within a plurality of registration conditions are registered and which conditions within them are unregistered. The unregistered-condition output unit 130 may display, for example, information relating to the unregistered condition on the display or the like as an image or characters. Further, the unregistered-condition output unit 130 may output audio information relating to the unregistered condition by a speaker or the like. The unregistered-condition output unit 130 may be configured to output additional information in addition to conditions relating to the unregistered condition. A detailed description of output examples by the unregistered-condition output unit will be given below.

(Flow of Operation)

Figure 3:
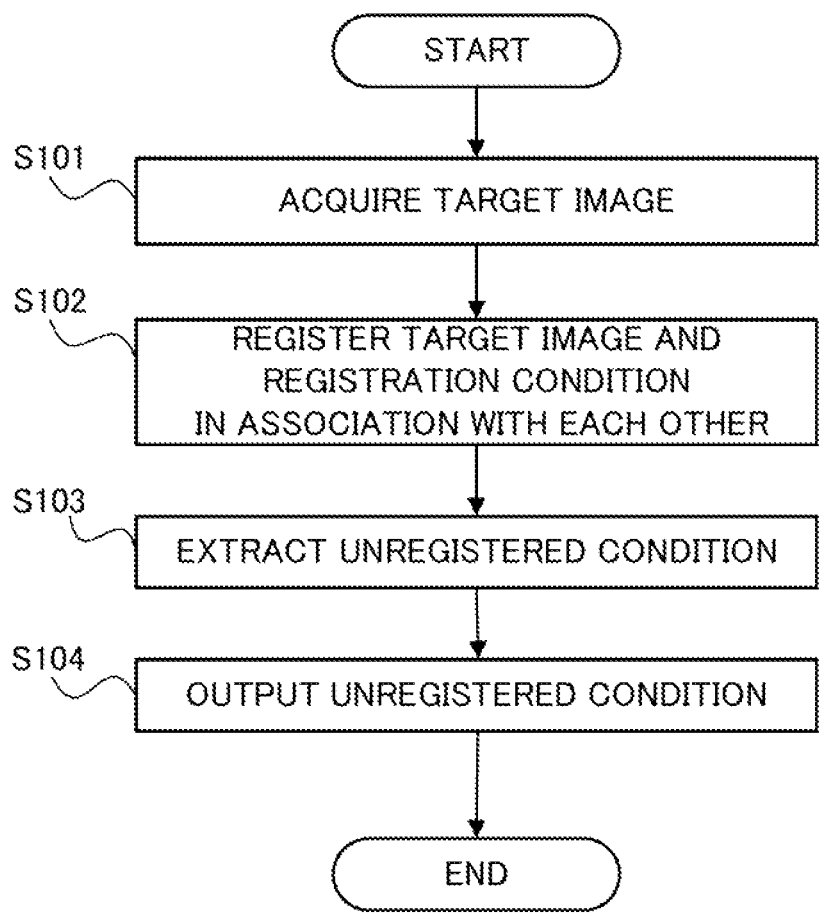
FIG. 3 is a flowchart showing a flow of operation by an information processing system according to the first example embodiment.

Next, referring to FIG. 3, a flow of operation by the information processing system 10 according to the first example embodiment will be described. FIG. 3 is a flowchart showing the flow of operation by the information processing system according to the first example embodiment.

As shown in FIG. 3, when the information processing system 10 according to the first example embodiment is operated, the image acquisition unit 110 first acquires the image of target (step S101). Prior to acquiring the image of target, processing for specifying the target may be implemented. Specifically, for example, after a personal ID being obtained from the target, the image may be acquired in a situation that it has been identified who the target is. The personal ID may be obtained from an ID card, a passport, or the like, or may be input by the target.

Subsequently, the registration unit 120 registers (stores) in the registration-image storage unit 122, the image of target acquired by the image acquisition unit 110 and the registration condition (specifically, the registration condition corresponding to the image of target) read from the registration-condition storage unit 121 in association with each other (step S102). When acquiring and registering the image of target (i.e., implementing the above-described step S101 and step S102), displaying, lamp lighting, or the like for indicating that the registration is in progress may be performed in order to prevent fraud such as spoofing.

Subsequently, the unregistered-condition output unit 130 extracts the unregistered condition that is not yet registered in the registration unit 120 (step S103). Then, the unregistered-condition output unit 130 outputs the information relating to the unregistered condition extracted (step S104).

In the above-described example, though the image is registered first and then the information relating to unregistered condition is outputted, the information relating to unregistered condition may be outputted before the image is registered. That is, it may be allowed to implement steps S103 and S104 by omitting steps S101 and S102.

Also, the series of processing described above may be implemented repeatedly until unregistered condition is eliminated (i.e., until images corresponding to all registration conditions are registered). For example, if two unregistered conditions are left, first, information relating to the first unregistered condition is outputted to prompt the target to register target's image corresponding to the first unregistered condition. And then, if the image corresponding to the first unregistered condition is registered, information relating to the second unregistered condition is outputted to prompt the target to register target's image corresponding to the second unregistered condition. And then, if the image corresponding to the second unregistered condition is registered, it may be determined that unregistered condition has been eliminated and the processing may be terminated. If it is impossible to register all images corresponding to all unregistered conditions (e.g., a case that wearing items the target owns are insufficient, etc.), it may be omitted to register target's image corresponding to the registration condition impossible to be satisfied.

(Output Examples of Unregistered Condition)

Figure 4:
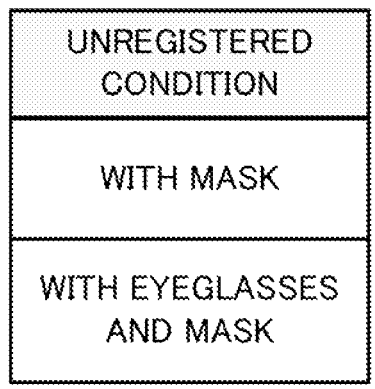
FIG. 4 is a table showing one example of unregistered conditions outputted by an information processing system according to the first example embodiment.

Next, referring to FIGS. 4 and 5, the output modes of unregistered conditions by the information processing system 10 according to the first example embodiment will be described using a specific example. FIG. 4 is a table showing an example of the unregistered conditions outputted by the information processing system according to the first example embodiment. FIG. 5 is a table showing an example of the unregistered conditions and registered conditions outputted by the information processing system according to the first example embodiment.

In the example shown in FIG. 4, it is assumed that four registration conditions are set: "no wearing items," "with eyeglasses," "with mask," and "with eyeglasses and mask." Then, it is assumed that images are registered for two registration conditions: "no wearing items" and "with eyeglasses" within the above four registration conditions. In this case, the unregistered-condition output unit 130 may output the remaining two conditions that are unregistered, namely "with mask" and "with eyeglasses and mask." As shown in FIG. 4, the unregistered-condition output unit 130 may output information relating to the unregistered conditions in a listing format. When such a list is viewed on the display, for example, the list may be displayed alone, or may be displayed with other information (e.g., the images of target), on the display.

In the example shown in FIG. 5, the unregistered-condition output unit 130, in addition to the information relating to the unregistered conditions, displays the conditions registered in the registration unit 120 (hereinafter, appropriately referred to as the "registered condition"). Specifically, it is indicated that, within the registration conditions: "no wearing items", "with eyeglasses", "with mask", and "with eyeglasses and mask", "no wearing items" and "with eyeglasses" are the registered conditions (corresponding to "o" in the figure). Further, it is indicated that "with mask" and "with eyeglasses and mask" are the unregistered conditions (corresponding to "x" in the figure). As such, the unregistered-condition output unit 130 may display further information in addition to the conditions relating to the unregistered conditions.

In the examples described above, the unregistered conditions are displayed in a list format. However, the output mode of unregistered conditions is not particularly limited. For example, the unregistered conditions may be displayed sequentially one by one independently. Further, the unregistered conditions may be outputted as an image diagram corresponding to the respective conditions (e.g., a mask image for the condition "with mask", etc.). Further, a massage to the target may be outputted in order to prompt the target to register target's image corresponding to the unregistered condition. For example, if an image corresponding to the registration condition "with mask" is unregistered, a message such as "Your image with mask is unregistered. Please take your image with mask on at your convenience" may be displayed.

Here, there have been described the examples where the registration conditions are conditions relating to wearing items of target. However, as mentioned above, the registration conditions may include a plurality of types of conditions. Display examples in such a case will be described in detail in other example embodiments to be described later.

Technical Effects

Next, technical effects obtained by the information processing system 10 according to the first example embodiment will be described.

As described in FIGS. 1 to 5, in the information processing system 10 according to the first example embodiment, the image of target is registered in association with the registration condition, and the information relating to unregistered conditions is output. In this way, a plurality of images corresponding to a plurality of conditions for a target is registered respectively. Therefore, it is possible to improve the robustness in the authentication processing. In other words, since a plurality of types of registration images corresponding to a plurality of states (i.e., conditions) of the target can be prepared, it is possible to reduce the influence caused by change of conditions when acquiring an image, and to improve the accuracy of the authentication processing. In addition, because the information relating to unregistered conditions is displayed, it is possible to prompt a target to register target's image corresponding to the unregistered condition and to register reliably an image corresponding to each condition.

Second Example Embodiment

The information processing system 10 according to a second example embodiment will be described with reference to FIGS. 6 to 9. The second example embodiment differs only in a part of the configuration and operation of the first example embodiment, and the other parts may be the same as those of the first example embodiment. Therefore, the part that differs from the first example embodiment described above will be described in detail below, and other overlapping parts will not be described as appropriate.
(Functional Configuration)

Figure 6:
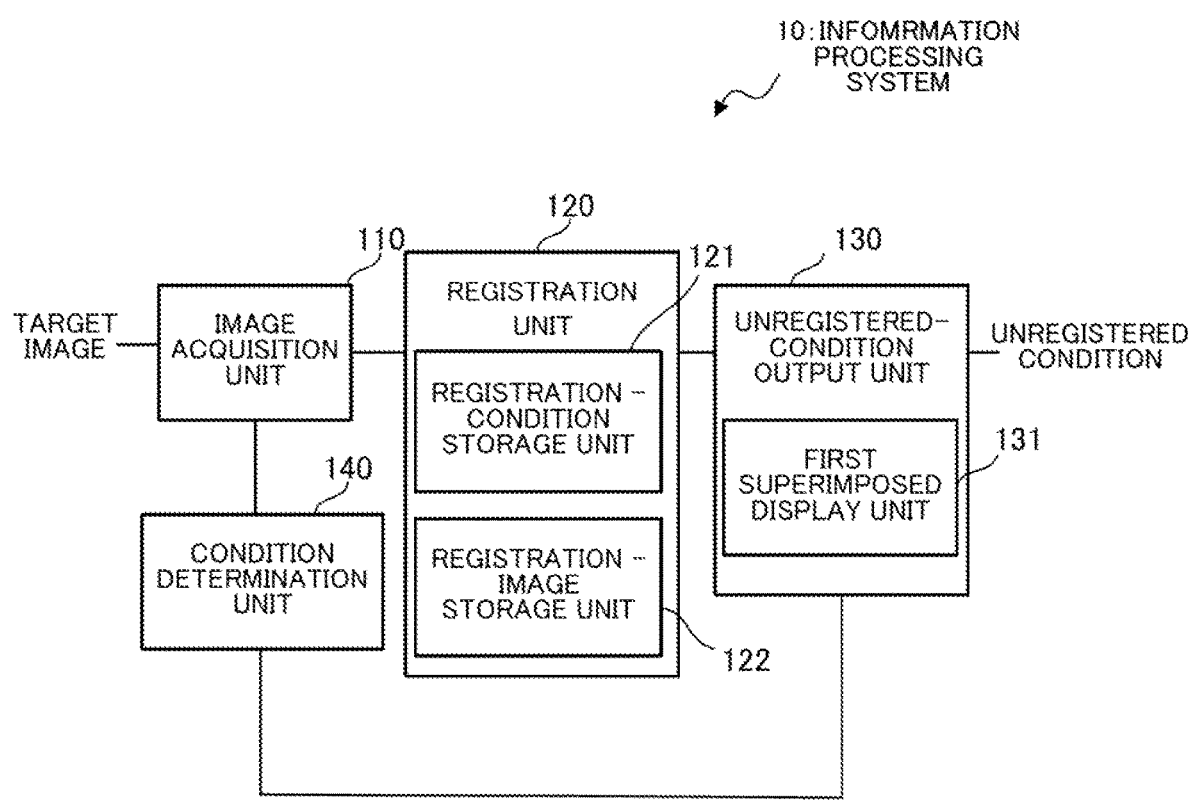
FIG. 6 is a block diagram showing a functional configuration of an information processing system according to the second example embodiment.

First, referring to FIG. 6, a description will be given of a functional configuration of the information processing system 10 according to the second example embodiment. FIG. 6 is a block diagram showing the functional configuration of the information processing system according to the second example embodiment. In FIG. 6, the reference signs same in FIG. 2 are given to the components similar to in FIG. 2 respectively.

As shown in FIG. 6, the information processing system 10 according to the second example embodiment is configured to comprise an image acquisition unit 110, a registration unit 120, an unregistered-condition output unit 130, and a condition determination unit 140 as components for realizing the function of the information processing system 10. That is, the information processing system 10 according to the second example embodiment is configured to further comprise the condition determination unit 140 in addition to the configuration of the first example embodiment (see FIG. 2). The condition determination unit 140, for example, may be a processing block implemented by the processor 11 described above (see FIG. 1). Further, the unregistered-condition output unit 130 according to the second example embodiment comprises a first superimposed display unit 131.

The condition determination unit 140 is configured so as to determine the registration condition that is acquirable from a target. That is, the condition determination unit 140 is configured so as to determine which registration condition's image is acquirable. The condition determination unit 140 may determine that the registration condition can be acquired based on, for example, the image of target. For example, when the target wears a mask in the image, the condition determination unit 140 may determine that the image corresponding to the registration condition "with mask" is acquirable. Alternatively, the condition determination unit 140 may determine the registration condition that can be acquired based on an input operation by the target. For example, when the target inputs information of holding a mask, the condition determination unit 140 may determine that the image corresponding to the registration condition "with mask" is acquirable.

The first superimposed display unit 131 is configured so as to display information indicating which a registration condition is, registered or unregistered, based on the determination result of the condition determination unit 140. More specifically, the first superimposed display unit 131 is configured so as to output on a position corresponding to an acquirable registration condition in the image of target, superimposed information indicating which the acquirable registration condition is, registered or unregistered. For example, if an image corresponding to the registration condition "with mask" is already registered, the first superimposed display unit 131 displays on a part corresponding to the mask the target wears (or a portion around the mouth where the mask is to be worn), information indicating that the image is already registered. For a specific display example by the first superimposed display unit 131 will be described in detail later.
(Flow of Operation)

Figure 7:
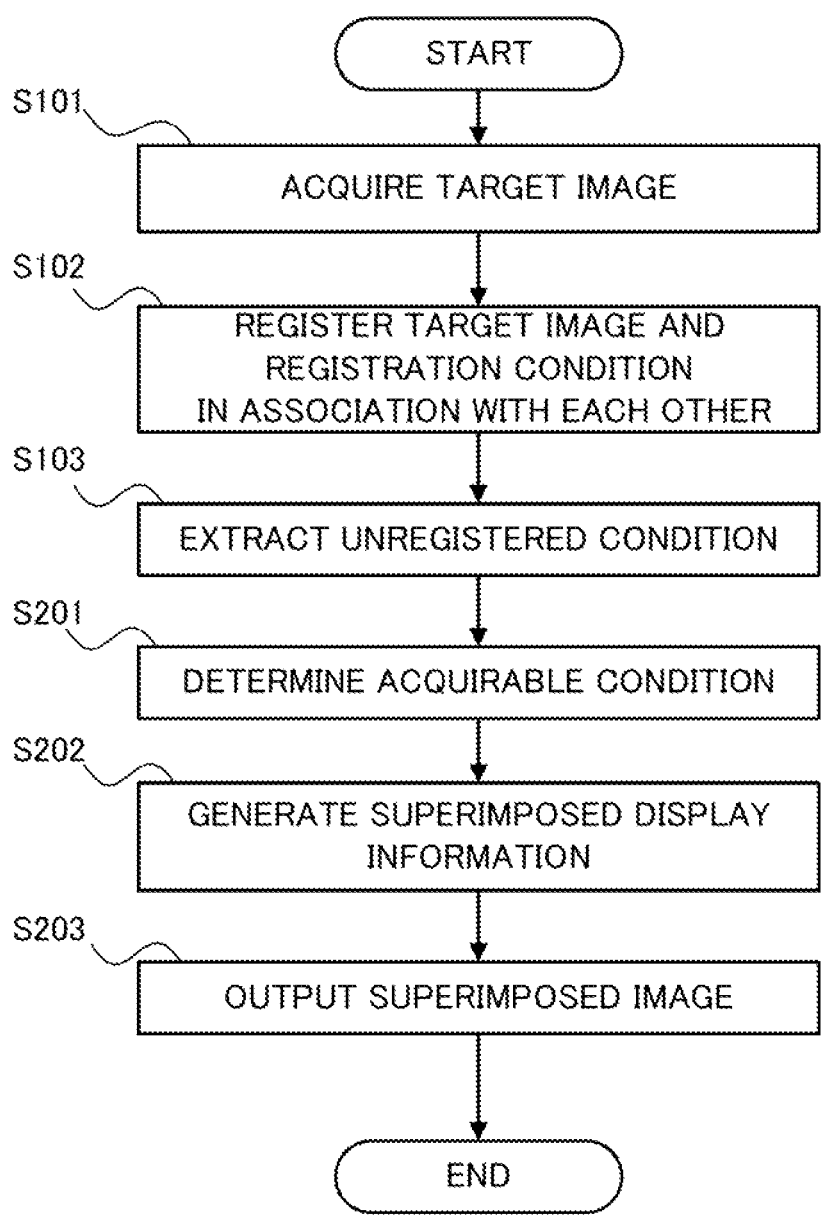
FIG. 7 is a flowchart showing a flow of operation by an information processing system according to the second example embodiment.

Next, referring to FIG. 7, a flow of operation by the information processing system 10 according to the second example embodiment will be described. FIG. 7 is a flowchart showing the flow of the operation by the information processing system according to the second example embodiment. In FIG. 7, the reference signs same in FIG. 3 are given to the processes similar to in FIG. 3 respectively.

As shown in FIG. 7, when the information processing system 10 according to the second example embodiment operates, first, the image acquisition unit 110 acquires the image of target (step S101). Then, the registration unit 120 registers in the registration-image storage unit 122, the image of target acquired by the image acquisition unit 110 and the registration condition read from the registration-condition storage unit 121 in association with each other (step S102). After that, the unregistered-condition output unit 130 extracts the unregistered conditions that are unregistered in the registration unit 120 (step S103).

Subsequently, in the second example embodiment, in particular, the condition determination unit 140 determines the registration conditions that can be acquired from the target (step S201). The determination processing by the condition determination unit 140 may be implemented in parallel simultaneously with the processes of steps S101 to S103 above described, or may be implemented in tandem. For example, the determination processing by the condition determination unit 140 may be implemented immediately after the target image is acquired (i.e., immediately after step S101).

Subsequently, the first superimposed display unit 131 generates based on the determination result of the condition determination unit 140, information (specifically, information indicating which each registration condition is registered or unregistered) to be displayed in a superimposed manner (step S202). Then, the first superimposed display unit 131 superimposes and displays the information generated in step S202 on a position corresponding to the corresponding registration condition in the image of target (for example, an image displayed for the target on the display) (step S203).

The information to be displayed superimposedly may be newly generated according to the subsequent registration status. For example, even when the information indicating non-registration first is displayed superimposedly, if the image corresponding to the information is registered by subsequent operation, information indicating that the corresponding image has been registered may be displayed. That is, in accordance with change in the registration status, the contents to be displayed superimposedly may be changed.

Specific Display Examples

Figure 8:
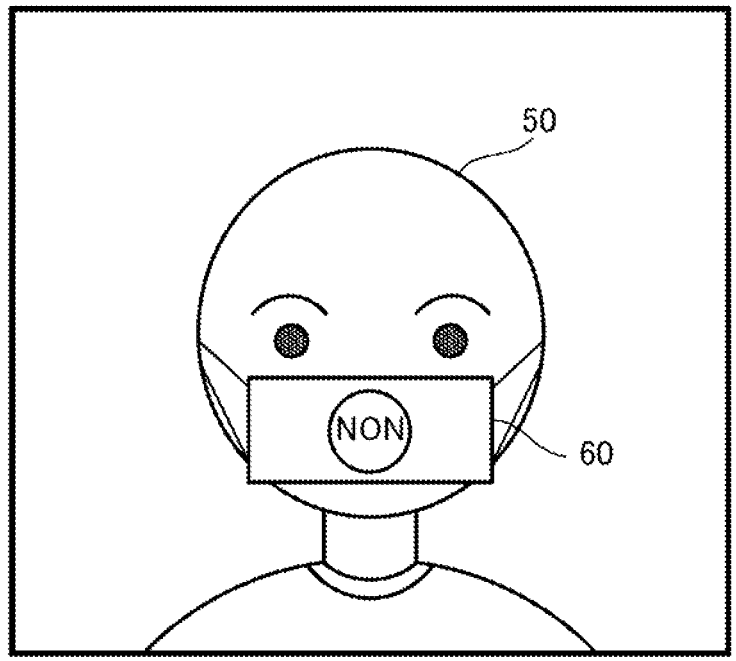
FIG. 8 is a plan view showing a display example (Part 1) by an information processing system according to the second example embodiment.
Figure 9:
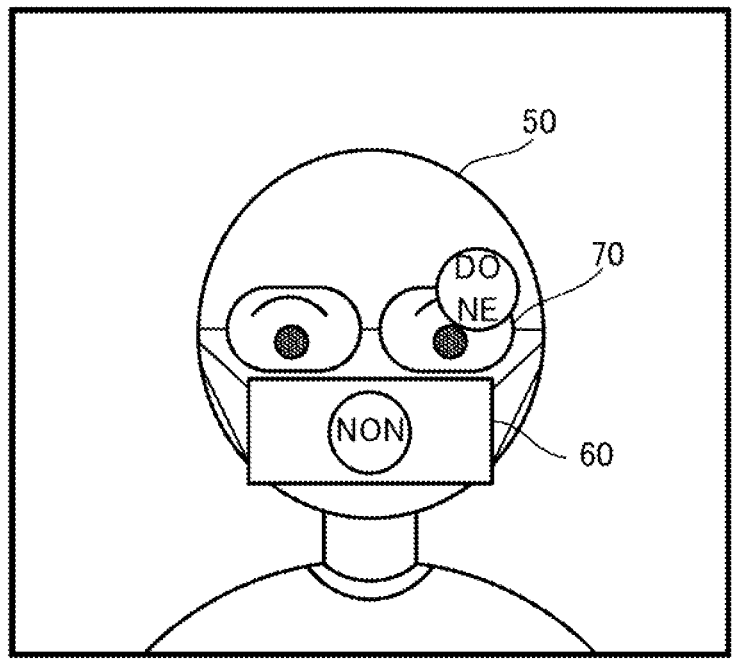
FIG. 9 is a plan view showing a display example (Part 2) by an information processing system according to the second example embodiment.

Next, with reference to FIGS. 8 and 9, specific examples of the superimposed display in the information processing system 10 according to the second example embodiment (i.e., display examples by the first superimposed display unit 131) will be described. FIG. 8 is a plan view showing a display example (Part 1) by the information processing system according to the second example embodiment. FIG. 9 is a plan view showing a display example (Part 2) by the information processing system according to the second example embodiment.

In the example shown in FIG. 8, the mark "NON" is displayed on the mask 60 the target 50 wears in a superimposed manner. This indicates that the image corresponding to the registration condition "with mask" is unregistered. Although the mark "NON" is displayed superimposedly on the mask 60 here, the other mark (e.g., the mark "x" or the like) may be displayed. The information to be superimposedly displayed may be a word or a sentence. For example, in the mask area, the word "Unregistered" may be displayed, or the sentence "This condition is unregistered" may be displayed.

In the example shown in FIG. 9, while, similarly to in the example shown in FIG. 8, the mark "NON" is superimposed on the mask 60 the target 50 wears, the mark "DONE" is superimposed on the eyeglasses 70 the target 50 wears. This indicates that while an image corresponding to the registration condition "with mask" is unregistered, an image corresponding to the registration condition "with eyeglasses" has been already registered. In this way, in addition to unregistered condition, the superimposed display may be performed with respect to the registered condition. Although the mark "DONE" is displayed superimposedly on the eyeglasses 70 here, the other mark (e.g., the mark "o", etc.) may be displayed. Further, the information to be superimposed may be a word or a sentence. For example, in the mask area, the word "Registered" may be displayed, or the word "This condition is registered" may be displayed.

In the above-described example, the configuration in which the information relating to unregistered condition is output only by the superimposed display is mentioned, but in addition to the superimposed display, the information relating to unregistered condition may be displayed in another manner. For example, in addition to the superimposed display shown in FIGS. 8 and 9, the list-type of information relating to unregistered condition shown in FIGS. 4 and 5 may be displayed.

Technical Effects

Next, technical effects obtained by the information processing system 10 according to the second example embodiment will be described.

As described in FIGS. 6 to 9, in the information processing system 10 according to the second example embodiment, the information relating to unregistered condition and the information relating to registered condition are displayed superimposedly on a corresponding portion of the target. In this way, it is possible to appropriately suggest to the target which registration condition's image is registered and which registration condition's image is unregistered (in other words, what kind of images should be added to be registered).

Third Example Embodiment

The information processing system 10 according to a third example embodiment will be described with reference to FIGS. 10 to 13. The third example embodiment differs from the above-described first and second example embodiments in a part of the configuration and operation, and the other parts may be the same as those of the first and second example embodiments. Therefore, the part that differs from the example embodiments described above will be described in detail below, and the other overlapping parts are not described as appropriate.

(Functional Configuration)

Figure 10:
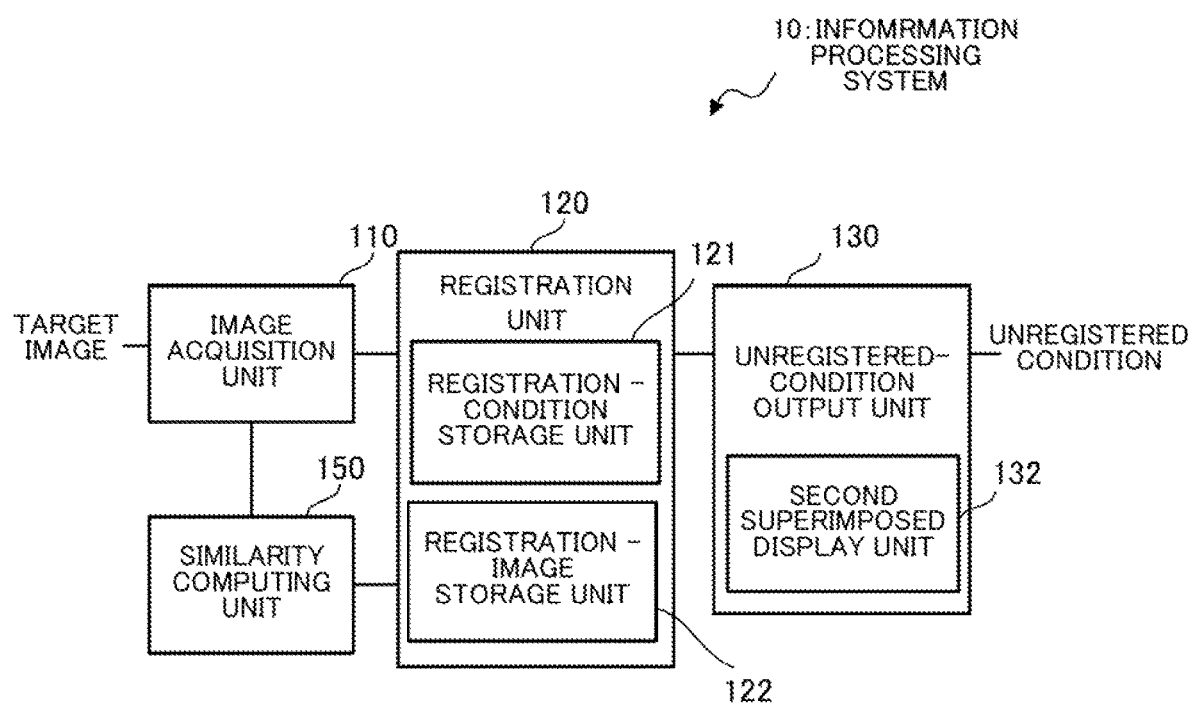
FIG. 10 is a block diagram showing a functional configuration of an information processing system according to the third example embodiment.

First, referring to FIG. 10, a description will be given of a functional configuration of the information processing system 10 according to the third example embodiment. FIG. 10 is a block diagram illustrating the functional configuration of the information processing system according to the third example embodiment. In FIG. 10, the reference signs same in FIG. 2 are given to the components similar to in FIG. 2 respectively.

As shown in FIG. 10, the information processing system 10 according to the third example embodiment is configured to comprise an image acquisition unit 110, a registration unit 120, an unregistered-condition output unit 130, and a similarity computing unit 150 as components for realizing the function of the information processing system 10. That is, the information processing system 10 according to the third example embodiment is configured to further comprise the similarity computing unit 150 in addition to the configuration of the first example embodiment (see FIG. 2). The similarity computing unit 150, for example, may be a processing block implemented by the processor 11 described above (see FIG. 1). Further, the unregistered-condition output unit 130 according to the third example embodiment comprises a second superimposed display unit 132.

The similarity computing unit 150 is configured so as to calculate the similarity degree between the image of target acquired by the image acquisition unit 110 and the registered image registered by the registration unit 120. When a plurality of registered images are registered in the registration unit 120, the similarity computing unit 150 calculates the similarity degree for each of the plurality of registered images. The similarity degree is preferably calculated with respect to all of the registered images. However, for example, when the number of registered images is very large (i.e., processing for calculating the similarity degree becomes processing with a large burden), some of the registered images may be selected to calculate the similarity degree only for the registered images selected. The similarity degree calculated by the similarity computing unit 150 is a value that indicates how much the image of target acquired by the image acquisition unit 110 is similar to the registered image. The method of calculating the similarity degree by the similarity computing unit 150 is not particularly limited. However, for example, the pattern matching may be used. Alternatively, the feature quantity may be extracted from each image to calculate the concordance rate with respect to the feature quantity. Information relating to the similarity degree calculated by the similarity computing unit 150 is configured to be outputted to the registration unit 120.

The registration unit 120 according to the third example embodiment has a function of determining whether or not the similarity degree calculated by the similarity computing unit 150 is equal to or greater than a predetermined value. The "predetermined value" here is set in advance as a threshold value for determining that the similarity degree is so high that it is determined that registering the new image is less meaningful. For example, in the case that the similarity degree is very high, even if the new image is registered, the registered image originally registered whose similarity degree is high also could perform functions similarly. Therefore, it is possible to determine that registering the new image is less meaningful.

The registration unit 120 is configured to register the image of target acquired by the image acquisition unit 110, in the case that the registered image whose similarity degree calculated by the similarity computing unit 150 is equal to or greater than the predetermined value does not exist. In other words, if even one registered image whose similarity degree calculated by the similarity computing unit 150 is equal to or greater than the predetermined value exists, the registration unit 120 may not register the image of target acquired by the image acquisition unit 110. More specifically, even if the image acquired by the image acquisition unit 110 is the one corresponding to the unregistered condition, if the registered image whose similarity degree is equal to or greater than the predetermined value exists, the registration unit 120 may not register the image of target acquired by the image acquisition unit 110.

The second superimposed display unit 132 is configured so as to, when the registration is performed based on the calculation result by the similarity computing unit 150, display information indicating that the corresponding registration condition is newly registered. More specifically, the second superimposed display unit 132 is configured so as to output, on a position corresponding to the registration condition of the newly registered image, the information indicating that the registration condition is newly registered in a superimposed manner. For example, when the image corresponding to the registration condition "with mask" is newly registered as a result of the determination using the similarity degree, the second superimposed display unit 132 displays the information indicating a new registration in the area of the mask the target wears. With respect to specific display examples by the second superimposed display unit 132 will be described in detail later.

(Flow of Operation)

Figure 11:
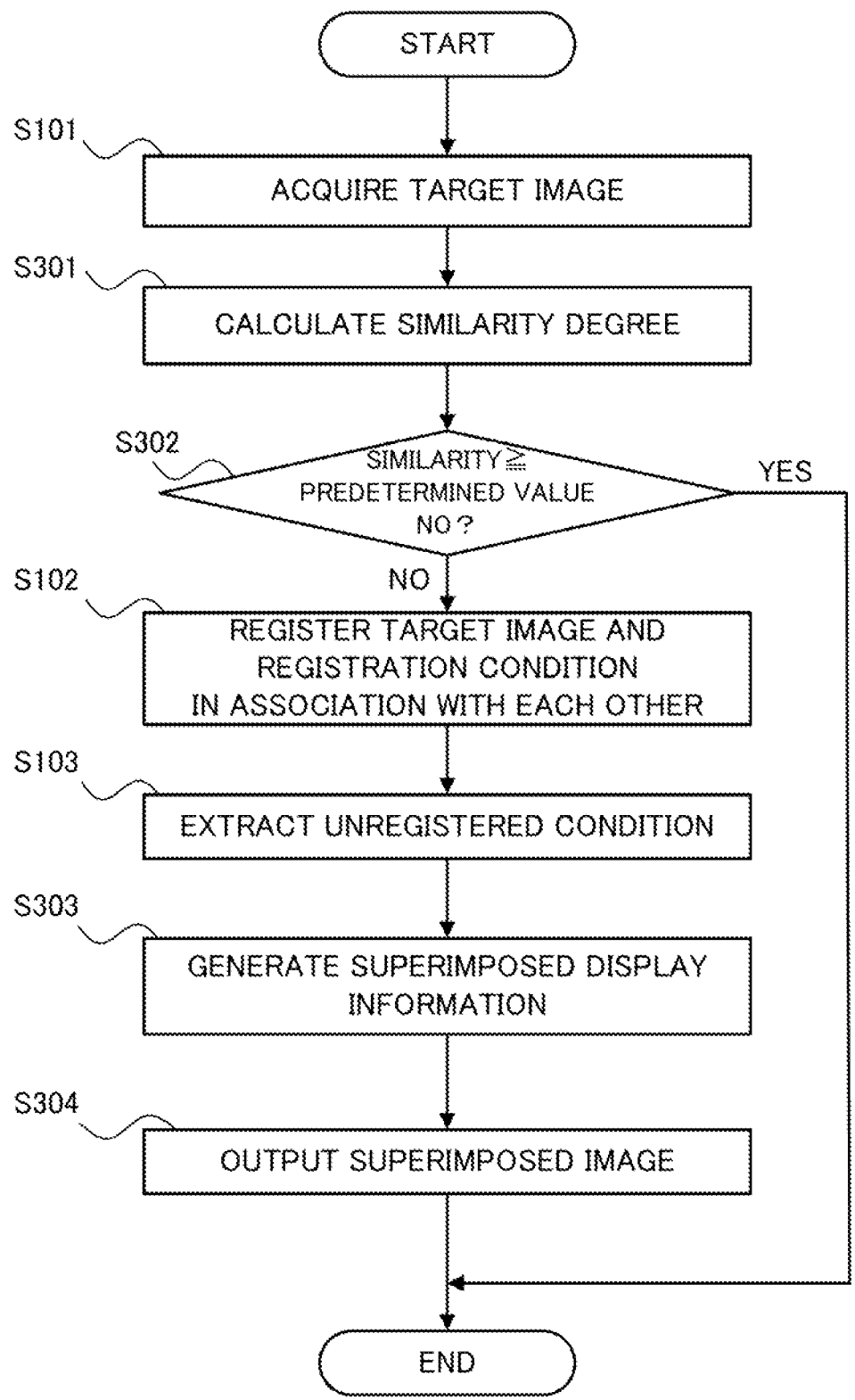
FIG. 11 is a flowchart showing a flow of operation by an information processing system according to the third example embodiment.

Next, referring to FIG. 11, a flow of operation by the information processing system 10 according to the third example embodiment will be described. FIG. 11 is a flowchart showing the flow of operation by the information processing system according to the third example embodiment. In FIG. 11, the reference signs same in FIG. 3 are given to the processes similar to in FIG. 3 respectively.

As shown in FIG. 11, when the information processing system 10 according to the third example embodiment operates, first, the image acquisition unit 110 acquires the image of target (step S101). Thereafter, the similarity computing unit 150 calculates the similarity degree between the image of target acquired by the image acquisition unit 110 and the registered image (step S301).

Subsequently, the registration unit 120 determines whether or not the registered image whose similarity degree calculated by the similarity computing unit 150 is equal to or greater than the predetermined value does not exist (step S302). If the registered image whose similarity degree is equal to or greater than the predetermined value exists (step S302: YES), the subsequent processing may be omitted. That is, the operation may be terminated in a state that the image acquired by the image acquisition unit 110 is unregistered.

On the other hand, if the registered image whose similarity degree is equal to or greater than the predetermined value does not exist (step S302: NO), the registration unit 120 registers in the registration-image storage unit 122, the image of target acquired by the image acquisition unit 110 and the registration condition read from the registration-condition storage unit 121 in association with each other (step S102). Then, the unregistered-condition output unit 130 extracts the unregistered conditions which are unregistered in the registration unit 120 (step S103).

Subsequently, the second superimposed display unit 132, with respect to the registration condition newly registered by the registration unit 120, generates the information for superimposed display (specifically, the information indicating that the corresponding registration condition is newly registered) (step S303). Then, the second superimposed display unit 132 superimposedly displays the information generated in step S303 on a position in the image of target (for example, the image of the target displayed on the display for the target), the position corresponding to the registration condition (step S304).

Specific Display Examples

Figure 12:
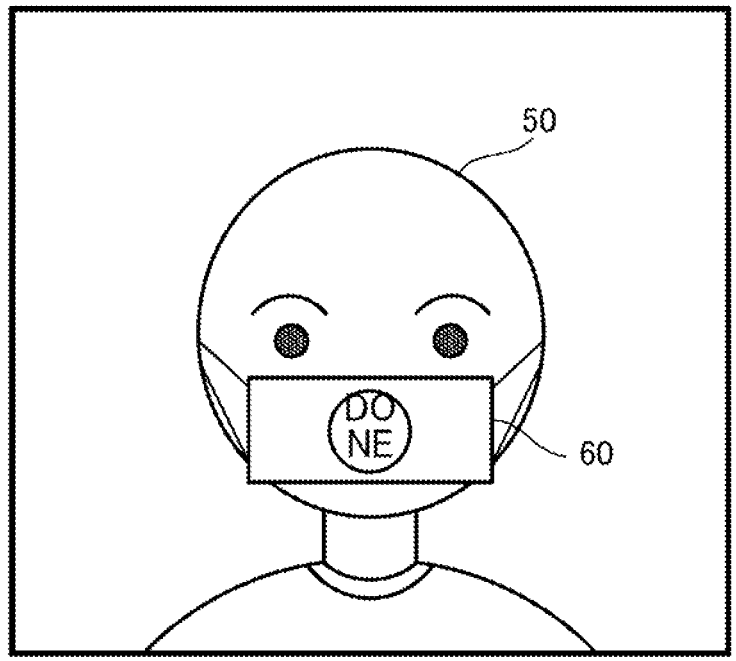
FIG. 12 is a plan view showing a display example (Part 1) by an information processing system according to the third example embodiment.
Figure 13:
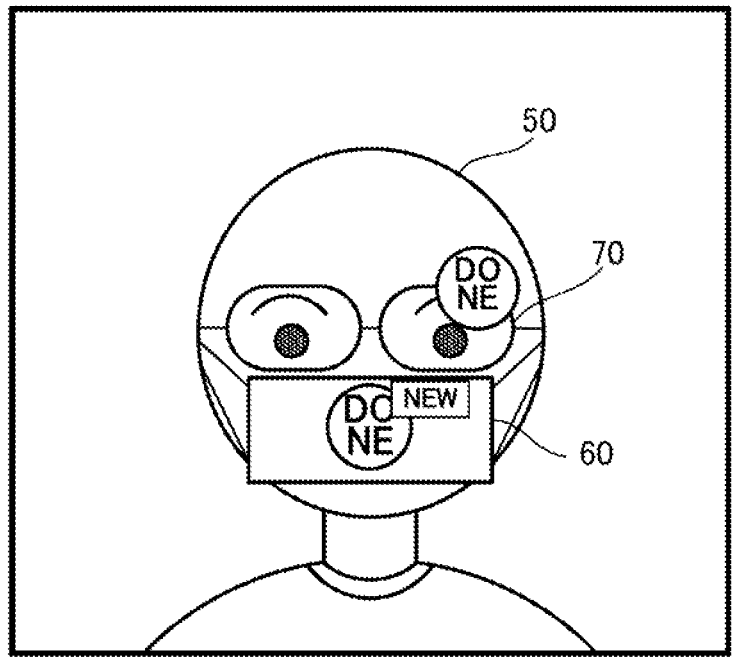
FIG. 13 is a plan view showing a display example (Part 2) by an information processing system according to the third example embodiment.

Next, with reference to FIGS. 12 and 13, specific examples of the superimposed display in the information processing system 10 according to the third example embodiment (i.e., display examples by the second superimposed display unit 132) will be described. FIG. 12 is a plan view showing a display example (Part 1) by the information processing system according to the third example embodiment. FIG. 13 is a plan view showing a display example (Part 2) by the information processing system according to the third example embodiment.

In the example shown in FIG. 12, the mark "DONE" is displayed superimposedly on the mask 60 the target 50 wears. This indicates that the image corresponding to the registration condition "with mask" has been newly registered in this operation. Although the mark "DONE is displayed superimposedly on the mask 60 here, the other mark (e.g., the mark "○", etc.) may be displayed. The information to be superimposedly displayed may be a word or a sentence. For example, the word "New Registration" may be displayed in the mask area, or the sentence "This condition has been newly registered" may be displayed.

In the example shown in FIG. 13, the mark "DONE" is displayed superimposedly on each of both the mask 60 and the eyeglasses 70 the target 50 wears. However, the sign "NEW" is added to the mark "DONE" displayed superimposedly on the mask 60. This indicates that the image corresponding to the registration condition "with mask" has been newly registered in this operation, and the image corresponding to the registration condition "with eyeglasses" is not the one which has been newly registered in this operation. That is, the sign "NEW" here is given for distinguishing between the condition newly registered and the condition registered in the past. The sign "NEW" may be replaced with the other sign (e.g. "LAST", etc.) that can be recognized as new.

In the above-described example, a configuration in which newly registered conditions are displayed in a superimposed manner, but in addition to this information, information relating to unregistered condition may be displayed. The information relating to unregistered condition may be displayed separately, for example, in the listing format shown in FIGS. 4 and 5. Alternatively, the information relating to unregistered condition may be superimposedly displayed, for example, as shown in FIGS. 8 and 9.

Technical Effects

Next, technical effects obtained by the information processing system 10 according to the third example embodiment will be described.

As described in FIGS. 10 to 13, in the information processing system 10 according to the third example embodiment, the similarity degree between the newly acquired image and the registered image is calculated, and when the registered image whose similarity degree is equal to or greater than the predetermined value does not exit, the acquired image is newly registered. In this way, since a new image is not registered if the registered image whose similarity degree is high has already existed, it is possible to reduce the amount of space for storing the registered images. Further, in the third example embodiment, with respect to the registration condition of the image newly registered, the information indicating new registration is displayed in a superimposed manner. In this way, it is possible to notify in an easy-to-understand manner, the target that the image acquired this time has been successfully registered Fourth Example Embodiment The information processing system 10 according to a fourth example embodiment will be described with reference to FIGS. 14 to 16. The fourth example embodiment differs only in a part of the configuration and operation of the first to third example embodiments described above, and the other parts may be the same as those of the first to third example embodiments. Therefore, the part differs from each of the example embodiments described above will be described in detail below, and other overlapping parts will not be described as appropriate.
(Functional Configuration)

Figure 14:
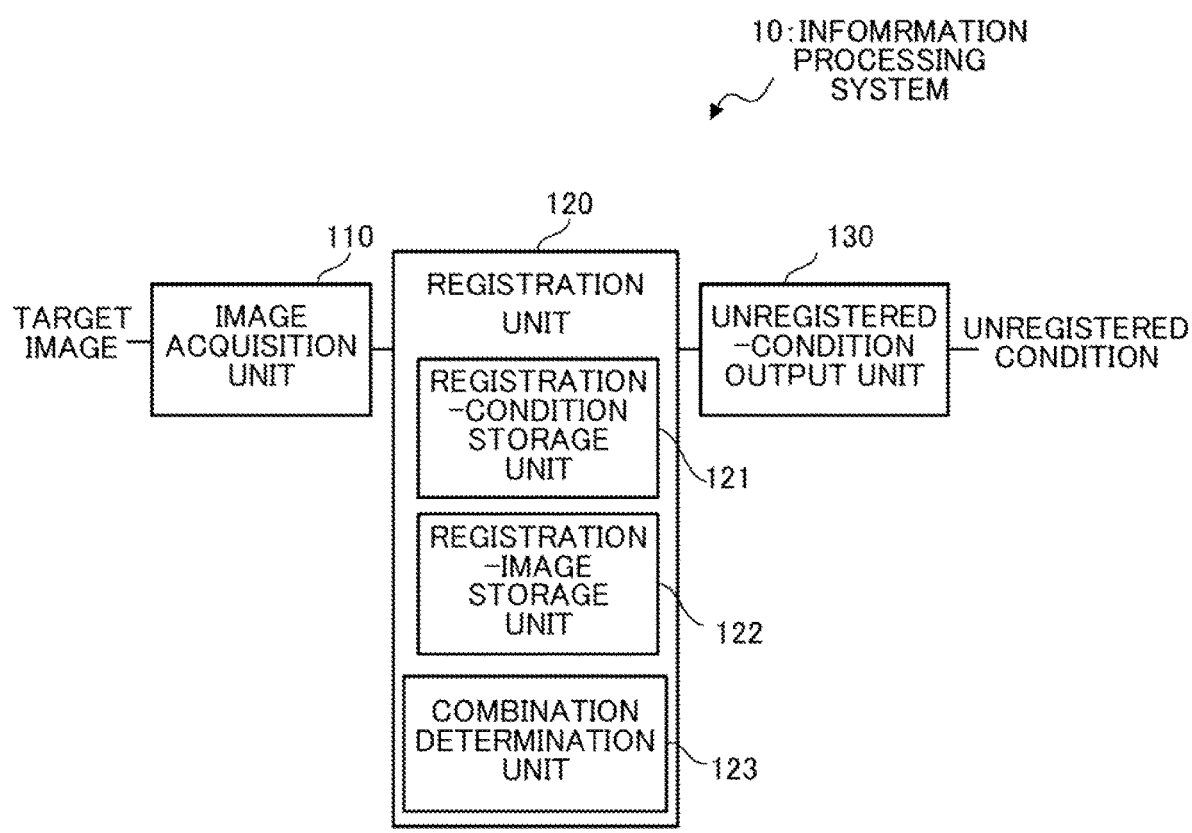
FIG. 14 is a block diagram showing a functional configuration of an information processing system according to the fourth example embodiment.

First, referring to FIG. 14, a description will be given of a functional configuration of the information processing system 10 according to the fourth example embodiment. FIG. 14 is a block diagram showing the functional configuration of the information processing system according to the fourth example embodiment; In FIG. 14, the reference signs same in FIG. 2 are given to the components similar to in FIG. 2 respectively.

As shown in FIG. 14, the information processing system 10 according to the fourth example embodiment is configured to comprise an image acquisition unit 110, a registration unit 120, and an unregistered-condition output unit 130 as components for realizing the function of the information processing system 10. In particular, the registration unit 120 according to the fourth example embodiment comprises, in addition to a registration-condition storage unit 121 and a registration-image storage unit 122, a combination determination unit 123.

The Combination determination unit 123 is configured so as to determine whether or not combinations of two or more conditions included in the registration conditions have been already registered. Here, the registration condition according to the fourth example embodiment includes a first condition for target's wearing items and a second condition for at least one of a line-of-sight orientation and a face orientation with respect to the target. The combination determination unit 123 is configured to determine whether or not the combination of the first condition and the second condition has been already registered (in other words, whether or not the registered image corresponding to the combination exists). An example of the combination of the first and second conditions will be described in detail later.

Although there have been described here the configuration for determining the combination of the two conditions, the combination determination unit 123 may be capable of determining the combination of three or more conditions. For example, the combination determination unit 123 may be configured so as to determine whether or not the registered image has been registered with respect to the first condition, the second condition, and the third condition.

The registration unit 120 according to the fourth example embodiment is configured to register the image of target acquired by the image acquisition unit 110 in the case that the combination of the first condition and the second condition is unregistered. For example, even if the registered image having the first condition same as the image acquired this time already exists, if the acquired image differs from the registered image in the second condition, the registration unit 120 newly registers the image acquired this time. Similarly, even if the registered image having the second condition same as the image acquired this time already exists, if the acquired image differs from the registered image in the first condition, the registration unit 120 newly registers the image acquired this time. Thus, registration unit 120 according to the fourth example embodiment may newly register, even if the registered image common to the acquired image with respect to a part of conditions exists, the acquired image not common to the acquired image with respect to all conditions.
(Flow of Operation)

Next, referring to FIG. 15, a flow of operation by the information processing system 10 according to the fourth example embodiment will be described. FIG. 15 is a flowchart showing the flow of operation by the information processing system according to the fourth example embodiment. In FIG. 15, the reference signs same in FIG. 3 are given to the processes similar to in FIG. 3 respectively.

As shown in FIG. 15, when the information processing system 10 according to the fourth example embodiment operates, first, the image acquisition unit 110 acquires the image of target (step S101). When the image of target is acquired, the combination determination unit 123 acquires from the registration-condition storage unit 121, the first and second conditions corresponding to the image of target (step S401).

Subsequently, the combination determination unit 123 determines whether the combination of the first condition and the second condition is unregistered (step S402). When it is determined that the combination of the first condition and the second condition is not unregistered (already registered) (step S402: NO), the subsequent processing may be omitted. That is, the operation may be terminated without newly registering image. However, even in a case that the image is not newly registered, the processing outputting the unregistered condition may be implemented. That is, the processing of steps S103 and S104 may be implemented.

On the other hand, when it is determined that the combination of the first condition and the second condition is unregistered (step S402: YES), the registration unit 120 register in the registration-image storage unit 122, the image of target acquired by the image acquisition unit 110 and the registration condition (specifically, the combination of the first condition and the second condition) in association with each other (step S102).

Subsequently, the unregistered-condition output unit 130 extracts the unregistered condition that is not yet registered in the registration unit 120 (step S103). Then, the unregistered-condition output unit 130 outputs the information of the unregistered condition extracted (step S104).

The series of processing described above may be implemented repeatedly until the combination which is unregistered is eliminated (i.e., until images corresponding to all combinations are registered).

Combination Example

Next, with reference to FIG. 16, a description will be given of a specific example with respect to the combination of the first and second conditions, the combination being determined in the information processing system 10 according to the fourth example embodiment. FIG. 16 is a table showing an example of the combination of the first condition and the second condition in the information processing system according to the fourth example embodiment and the registration status thereof. In the following example, the line-of-sight direction is used as the second condition. However, the second condition may be a condition other than the line-of-sight direction. For example, the second condition may be a condition for face orientation. The second condition may also include a plurality of conditions, such as the line-of-sight direction+the face orientation.

In the example shown in FIG. 16, as the first condition for target's wearing items, four conditions are set: "no wearing items," "with eyeglasses," "with mask," and "with eyeglasses and mask." In addition, as the second condition for the line-of-sight direction of target, three conditions are set: "camera front," "upper direction", and "right direction." There are 12 possible combinations of these first and second conditions. Specifically, in FIG. 16, there are shown a combination of "no wearing items" and "camera front"; a combination of "with eyeglasses" and "camera front"; a combination of "with mask" and "camera front"; a combination of "with eyeglasses and mask" and "camera front"; a combination of "no wearing items" and "upper direction"; a combination of "with eyeglasses" and "upper direction"; a combination of "with mask" and "upper direction", a combination of "with eyeglasses and mask" and "upper direction"; a combination of "no wearing items" and "right direction"; a combination of "with eyeglasses" and "right direction"; a combination of "with mask" and "right direction"; and a combination of "with eyeglasses and mask" and "right direction".

With respect to the combinations in which the first condition is "no wearing items", all of the combinations: "no wearing items" and "camera front"; "no wearing items" and "upper direction"; and "no wearing items" and "right direction" have already been registered. Therefore, an image whose first condition is "no wearing items" will not be registered regardless of the second condition. That is, the image is not registered even if the second condition thereof is any one of "camera front", "upward" or "right direction".

Next, with respect to the combinations in which the first condition is "with eyeglasses", while the combination of "with glasses" and "camera front" has been already registered, the combination of "with eyeglasses" and "upper direction" and the combination of "with eyeglasses" and "right direction" are unregistered. Therefore, with respect to an image whose first condition is "with eyeglasses", the image is not registered if the second condition thereof is "camera front". On the other hand, the image is registered if the second condition thereof is "upper direction" or "right direction".

Next, with respect to the combinations in which the first condition is "with mask", while the combinations: "with mask" and "camera front"; and "with mask" and "right direction" are unregistered, the combination of "with mask" and "upper direction" has been already registered. Therefore, with respect to an image whose first condition is "with mask", the image is registered if the second condition thereof is "camera front" or "right direction". On the other hand, the image is not registered if the second condition thereof is "upper direction"

Next, with respect to at the combinations in which the first condition is "with eyeglasses and mask", all of the combinations: "with eyeglasses and mask" and "camera front", "with eyeglasses and mask" and "upper direction", and "with eyeglasses and mask" and "with right direction" are unregistered. Therefore, an image whose first condition is "with eyeglasses and mask" will be registered regardless of the second condition thereof. That is, the image is registered even if the second condition thereof is any one of "camera front", "upper direction", or "right direction".

As for the registration condition for line-of-sight direction (or face direction), only by outputting an instruction to a user, the corresponding image is possible to be registered relatively easily. For example, in a case that the condition for line-of-sight direction "camera front" is unregistered, a message such as "Take your image while facing the camera front" may be displayed. In addition, in a case that the camera is set near the operation screen, a message such as "Take your image while looking at the operation screen" may be displayed. On the other hand, in a case that the condition for line-of-sight direction: "upper direction"; or "right direction" is unregistered, a message may be displayed in order to prompt the user to change his/her line-of-sight direction, such as "Take your image with facing upward" or "Take your image with facing rightward".

Technical Effects

Next, a description will be given of technical effects obtained by the information processing system according to the fourth example embodiment.

As described in FIGS. 14 to 16, in the information processing system 10 according to the fourth example embodiment, the image of target is newly registered when the combination of the first condition and the second condition is unregistered. In this way, the image having conditions some of which are common, but the other of which are different is registered. Therefore, it is possible to further increase variations of registered images.

Fifth Example Embodiment

The information processing system 10 according to a fifth example embodiment will be described with reference to FIGS. 17 to 21. The fifth example embodiment differs only in a part of the configuration and operation of the first to fourth example embodiments described above, and the other parts may be the same as those of the first to fourth example embodiments. Therefore, the part that differs from the example embodiments described above will be described in detail below, and other overlapping parts will not be described as appropriate.

(Functional Configuration)

Figure 17:
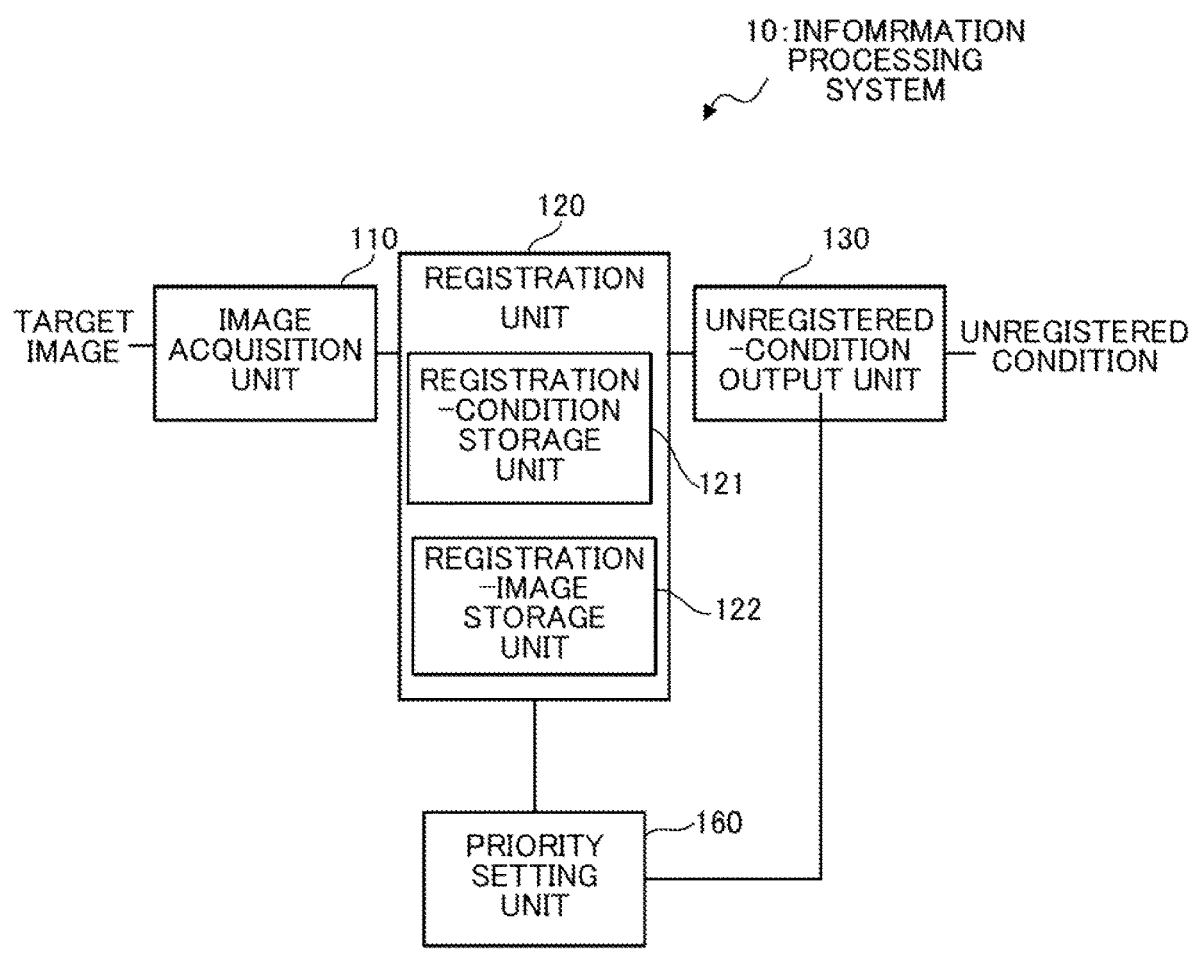
FIG. 17 is a block diagram showing a functional configuration of an information processing system according to the fifth example embodiment.

First, a functional configuration of the information processing system 10 according to the fifth example embodiment will be described with reference to FIG. 17. FIG. 17 is a block diagram showing the functional configuration of the information processing system according to the fifth example embodiment. In FIG. 17, the reference signs same in FIG. 2 are given to the components similar to in FIG. 2 respectively.

As shown in FIG. 17, the information processing system 10 according to the fifth example embodiment is configured to comprise an image acquisition unit 110, a registration unit 120, an unregistered-condition output unit 130, and a priority setting unit 160 as components for realizing the functions of the information processing system 10. That is, the information processing system according to the fifth example embodiment is configured to comprise, in addition to the configuration of the first example embodiment (see FIG. 2), the priority setting unit 160. The priority setting unit 160 may be, for example, a processing block implemented by the processor 11 described above (see FIG. 1).

The priority setting unit 160 is configured so as to set priority for each of the plurality of registration conditions. The priority is a parameter that indicates how much preferentially the registration condition should be outputted when the registration condition is outputted as the unregistered condition. The priority setting unit 160 sets the priority according to the type (use application) of image of target. For example, the priority setting unit 160 may set a different priority to the image of target between a case where the image of target is used for facial authentication and a case where the image of target is used for iris authentication. The setting criteria for the priority may be set in advance according to the type of image. The priority is not set for each time, but may be stored in association with each registration condition. In this case, instead of the priority setting unit 160, there may be provided a priority storage unit for storing the priority corresponding to each of the registration conditions.

The unregistered-condition output unit 130 according to the fifth example embodiment is configured to output information relating to the unregistered condition according to the priority set by the priority setting unit 160. More specifically, the unregistered-condition output unit 130 may be configured to output preferentially within a plurality of registration conditions, information relating to the registration condition having a higher priority. A specific output mode according to the unregistered-condition output unit 130 will be described in detail later.

(Flow of Operation)

Figure 18:
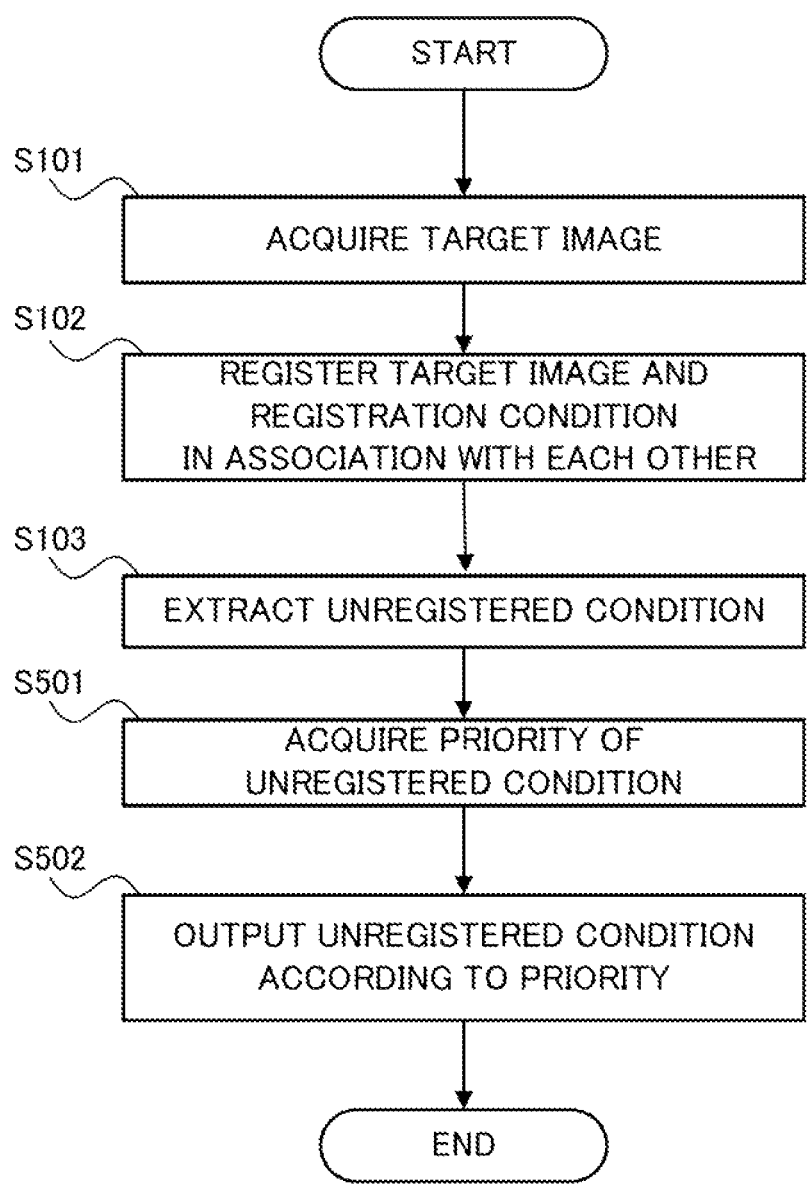
FIG. 18 is a flowchart showing a flow of operation by an information processing system according to the fifth example embodiment.

Next, referring to FIG. 18, a flow of operation by the information processing system 10 according to the fifth example embodiment will be described. FIG. 18 is a flowchart showing the flow of operation by the information processing system according to the fifth example embodiment. In FIG. 18, the reference signs same in FIG. 3 are given to the processes similar to in FIG. 3 respectively.

As shown in FIG. 18, when the information processing system 10 according to the fifth example embodiment operates, first, the image acquisition unit 110 acquires the image of target (step S101). After that, the registration unit 120 registers in the registration-image storage unit 122, the image of target acquired by the image acquisition unit 110 and the corresponding registration condition in association with each other (step S102). Then, the unregistered-condition output unit 130 extracts the unregistered conditions that are unregistered in the registration unit 120 (step S103).

Subsequently, the unregistered-condition output unit 130 acquires the priority corresponding to each of the unregistered conditions extracted (step S501). That is, the unregistered-condition output unit 130 acquires the priority set by the priority setting unit 160. Then, the unregistered-condition output unit 130 outputs information relating to unregistered condition according to its priority. (step S502)

(Setting Example of Priority)

Next, referring to FIG. 19, a setting example of priority by the priority setting unit 160 according to the fifth example embodiment will be specifically described. FIG. 19 is a table showing the setting example of priority in the information processing system according to the fifth example embodiment.

In the example shown in FIG. 19, the priority is set separately for each type of image of target: one is set for a face image (i.e. the image to be used for facial authentication); and the other one is set for an iris image (i.e. the image to be used for iris authentication). In this example, in order from the highest priority, priority order 1, priority order 2, and priority order 3 are set. Here, for convenience of explanation, the table shows only up to priority order 3. However, priority order 4 or more may be set.

With respect to specific priority order, when the image of target is a face image, priority order 1 is set to a "mask", priority order 2 is set to "eyeglasses", and priority order 3 is set to a "hat". This is because a mask, eyeglasses, and a hat are worn in such a way as to cover a part of the face of target, which greatly affects authentication accuracy of the facial authentication using the face image. On the other hand, when the image of target is an iris image, priority order 1 is set to "eyeglasses," priority order 2 is set to "sunglasses," and priority order 3 is "contact lenses." This is because eyeglasses, sunglasses, and contact lenses are worn in such a way as to cover a part of eyes, which greatly affects authentication accuracy of the iris authentication using the iris image. The setting example in FIG. 19 is just one example, the different priorities may be set according to the type of image. In addition, priorities may be set according to the use application of image rather than the type of image. For example, in the case of performing facial authentication using image, priorities may be set so that the priorities of "mask," "eyeglasses," "hat," etc. which greatly affect authentication accuracy of the facial authentication become higher. In the case of performing iris authentication using image, priorities may be set so that the priorities of "eyeglasses," "sunglasses," "contact lenses," etc., which greatly affect authentication accuracy of the iris authentication become higher.

Specific Display Examples

Figure 20:
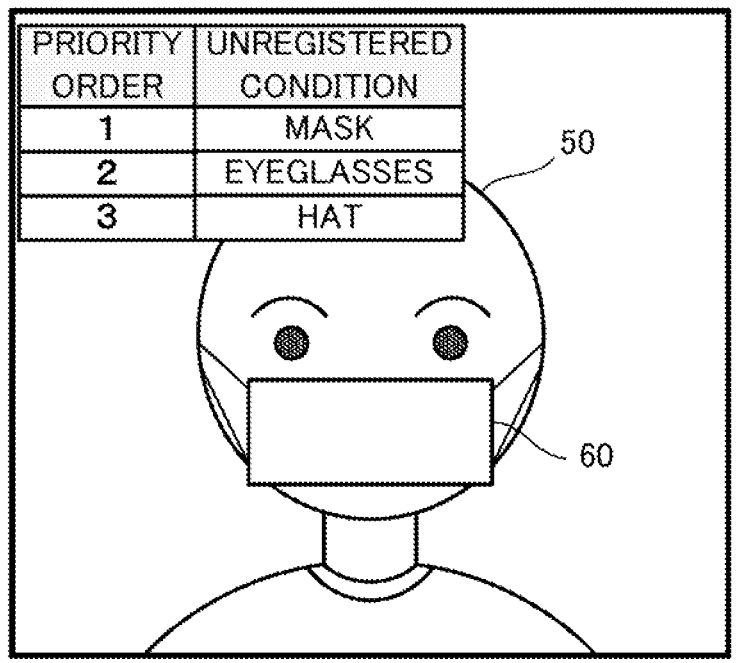
FIG. 20 is a plan view showing a display example (Part 1) according to priority by an information processing system according to the fifth example embodiment.
Figure 21A:
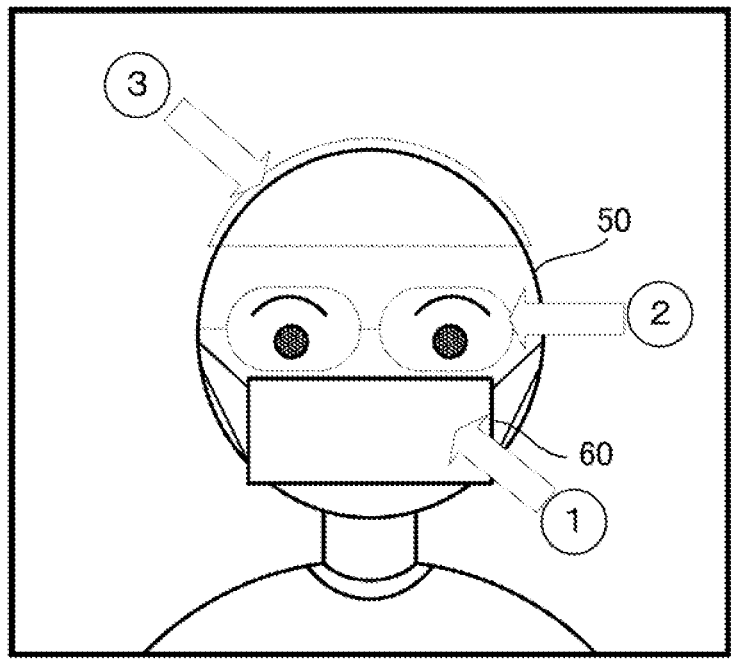
FIG. 21 is a plan view showing a display example (Part 2) according to priority by an information processing system according to the fifth example embodiment.
Figure 21B:
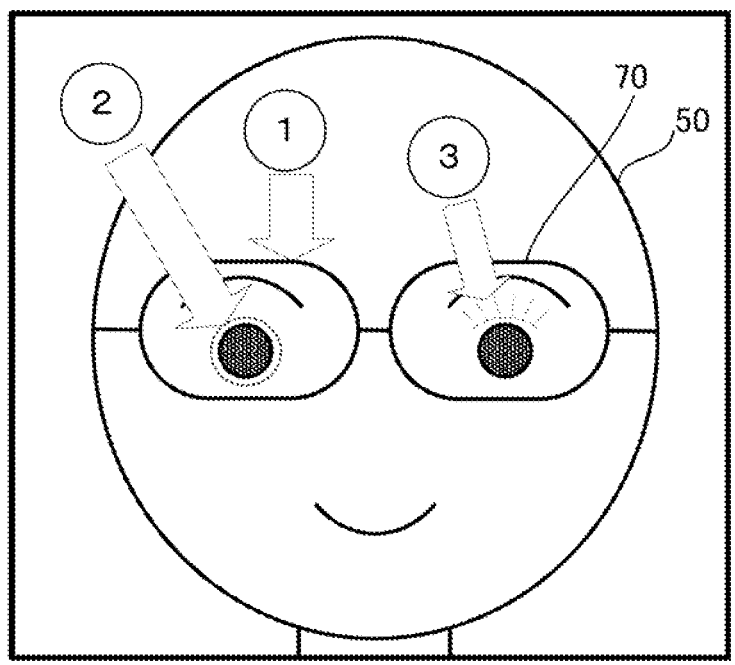

Next, with reference to FIGS. 20, 21A and 21B, specific display examples by the information processing system 10 according to the fifth example embodiment (i.e., a display example in consideration of the priority) will be specifically described. FIG. 20 is a plan view showing a display example according to the priority by the information processing system according to the fifth example embodiment (Part 1). Each of FIG. 21A and FIG. 21B is a plan view showing a display example according to the priority by the information processing system according to the fifth example embodiment (Part 2).

As shown in FIG. 20, the unregistered-condition output unit 130 may output information relating to unregistered conditions in a priority-ordered listing format. The list of unregistered conditions may be displayed with the image of target. Here, at the top left of the target 50, the mask, the eyeglasses, and the hat, which are the unregistered conditions, are displayed in the priority-ordered listing format. Although three unregistered conditions are displayed here, a smaller number of unregistered conditions may be displayed, or a larger number of unregistered conditions may be displayed. For example, the unregistered-condition output unit 130 may display, within the unregistered conditions, only a single unregistered condition having the highest priority.

As shown in FIGS. 21A and 21B, the unregistered-condition output unit 130 may output information relating to unregistered condition as an arrow and a number indicating the priority. The image shown in FIG. 21A is a display example for a case of performing facial authentication. The arrow is displayed in such a way as to extend toward the mask 60 from "1" indicating the priority order 1. This indicates that the priority order of the mask 60 is 1 (i.e., the mask 60 has the highest priority) in the case of performing the facial authentication. Also, another arrow is displayed in such a way as to extend toward the broken lines indicating the eyeglasses from "2" indicating the priority order 2. This indicates that the priority order of the eyeglasses is 2 (i.e., the eyeglasses have the second highest priority) in the case of performing the facial authentication. Further, the further arrow is displayed in such a way as to extend toward the broken lines indicating the hat from "3" indicating the priority order 3. This indicates that the priority order of the hat is 3 (i.e., the hat has the third highest priority) in the case of performing the facial authentication. With respect to a wearing item that the target does not wear at this moment, similarly to a case of the eyeglasses and the hat here, the virtual wearing item may be virtually displayed, with a broken line or the like, at the position where the wearing item should be worn. The image shown in FIG. 21B is a display example for a case of performing iris authentication. The arrow is displayed in such a way as to extend toward the eyeglasses 70 from "1" indicating the priority order 1. This indicates that the priority order of the eyeglasses 70 is 1 (i.e., the eyeglasses 70 has the highest priority) in the case of performing the iris authentication. Also, another arrow is displayed in such a way as to extend toward the broken line indicating the contact lens from "2" indicating the priority order 2. This indicates that the priority order of the contact lenses is 2 (i.e., the contact lenses have the second highest priority) in the case of performing the iris authentication. Further, the further arrow is displayed in such a way as to extend toward the broken lines indicting the false eyelashes from "3" indicating the priority order 3. This indicates that the priority order of the false eyelashes is 3 (i.e., the false eyelashes have the third highest priority) in the case of performing the iris authentication.

In FIGS. 20, 21A and 21B, examples of displaying the priority orders are shown. However, the priority may be displayed instead of the priority order. For example, a store (the larger the store, the higher the priority) may be displayed, the score being obtained by quantifying the priority in a range between 0 and 100.

Technical Effects

Next, technical effects obtained by the information processing system 10 according to the fifth example embodiment will be described.

As described in FIGS. 17 to 21B, in the information processing system 10 according to the fifth example embodiment, the information relating to unregistered condition is outputted in accordance with the priority. In this way, the higher-priority unregistered condition (i.e., the condition to be preferentially registered) can be notified to the target in an easy-to-understand manner. Since the priority is set according to the type (or use application) of image, it is possible to appropriately determine according to the type of image to be registered, which conditions should be registered preferentially.

Sixth Example Embodiment

The information processing system 10 according to a sixth example embodiment will be described with reference to FIGS. 22 to 24. The sixth example embodiment differs only in a part of the configuration and operation of the first to fifth example embodiments described above, and the other parts may be the same as those of the first to fifth example embodiments. Therefore, the part that differs from the example embodiments described above will be described in detail below, and the other overlapping parts will not be described as appropriate.

(Functional Configuration)

First, a functional configuration of the information processing system 10 according to the sixth example embodiment will be described with reference to FIG. 22. FIG. 22 is a block diagram showing the functional configuration of the information processing system according to the sixth example embodiment. In FIG. 22, the reference signs same in FIG. 2 are given to the components similar to in FIG. 2 respectively.

Figure 22:
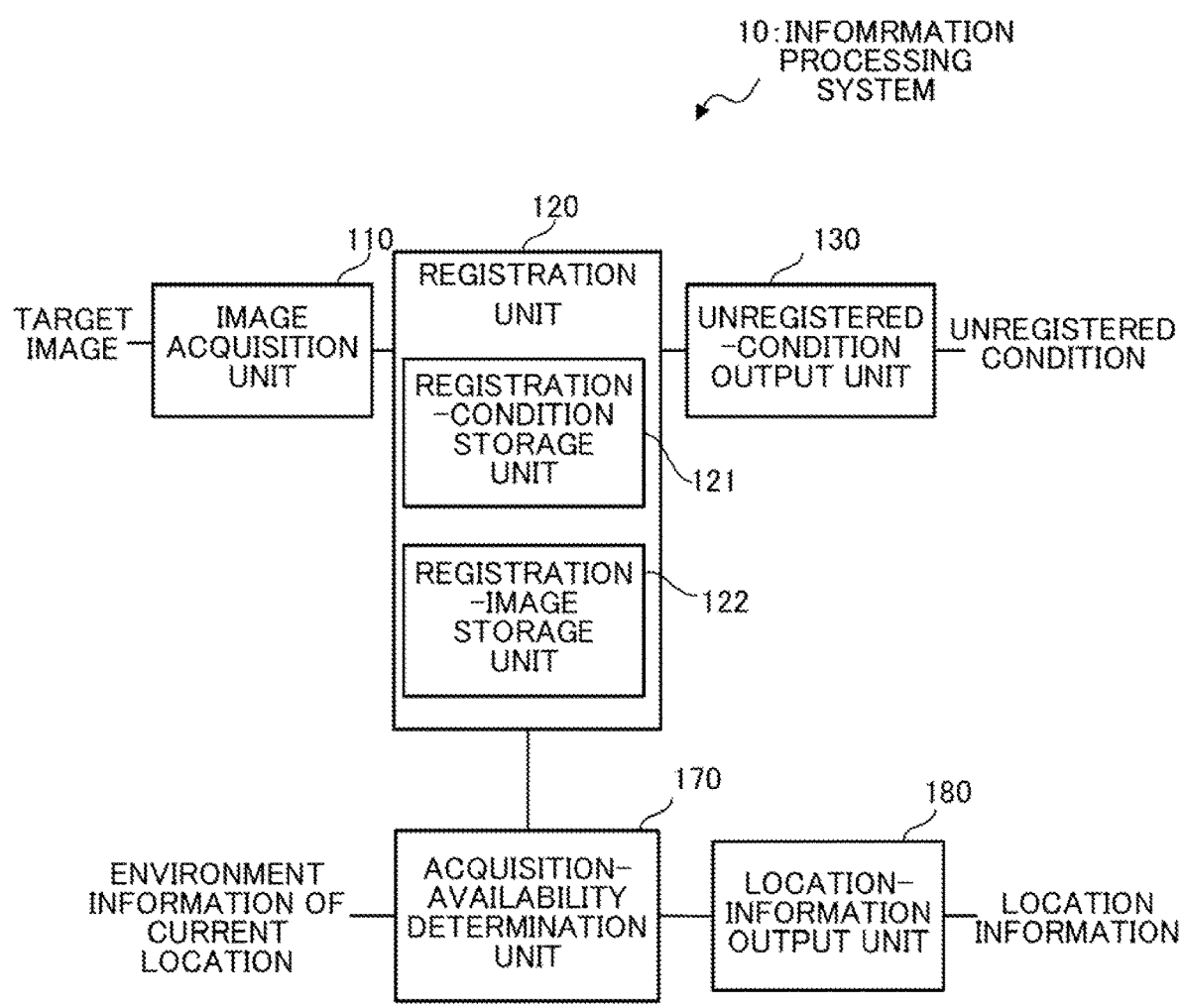
FIG. 22 is a block diagram showing a functional configuration of an information processing system according to the sixth example embodiment.

As shown in FIG. 22, the information processing system 10 according to the sixth example embodiment is configured to an image acquisition unit 110, a registration unit 120, an unregistered-condition output unit 130, an acquisition-availability determination unit 170, and a location-information output unit 180 as components for realizing the functions of the information processing system 10. That is, the information processing system 10 according to the sixth example embodiment is configured to comprise, in addition to the configuration of the first example embodiment (see FIG. 2), the acquisition-availability determination unit 170 and the location-information output unit 180. Each of the acquisition-availability determination unit 170 and the location-information output unit 180 may be, for example, a processing block implemented by the processor 11 described above (see FIG. 1).

The acquisition-availability determination unit 170 is configured so as to determine whether or not the image corresponding to the unregistered condition that is unregistered in the registration unit 120 (hereinafter, appropriately referred to as the "unregistered image") is acquirable at the current location. Whether or not the unregistered image is acquirable may be determined based on environmental information of the current location. For example, whether or not the unregistered image is acquirable may be determined depending on whether or not imaging environment at the moment satisfies imaging conditions of the unregistered image. More specifically, the acquisition-availability determination unit 170 may determine whether or not the unregistered image is acquirable according to the camera-specifications, the brightness of image location, and the like. The determination result of the acquisition-availability determination unit 170 is configured to be output to the location-information output unit 180.

The location-information output unit 180 is configured so as to output information relating to a location where the unregistered image is acquirable when it is determined that the unregistered image is not acquirable at the current location. That is, the location-information output unit 180 is configured so as to output information for guiding the target to the location where the unregistered image can be registered. The location information output unit 180 may have a function of storing the location information and, in association with the location information, information indicating what image at that location is acquirable at the corresponding location. In this case, the location-information output unit 180 may read out from the stored location information and output the location information of the location where the unregistered image is acquirable. Alternatively, the location-information output unit 180 may search and acquire from an external database or the like, the location information of the location where the unregistered image is acquirable, and output the information acquired. The location-information output unit 180, for example, may display the location information (e.g., the map information) on the display. The location-information output unit 180 may, for example, perform audio output with a speaker for outputting the location information (e.g., the address, the route, and the like). Specific output examples of the location information will be described in detail later.

(Flow of Operation)

Next, referring to FIG. 23, a flow of operation by the information processing system 10 according to the sixth example embodiment will be described. FIG. 23 is a flowchart showing the flow of operation by the information processing system according to the sixth example embodiment. In FIG. 23, the reference signs same in FIG. 3 are given to the processes similar to in FIG. 3 respectively.

Figure 23:
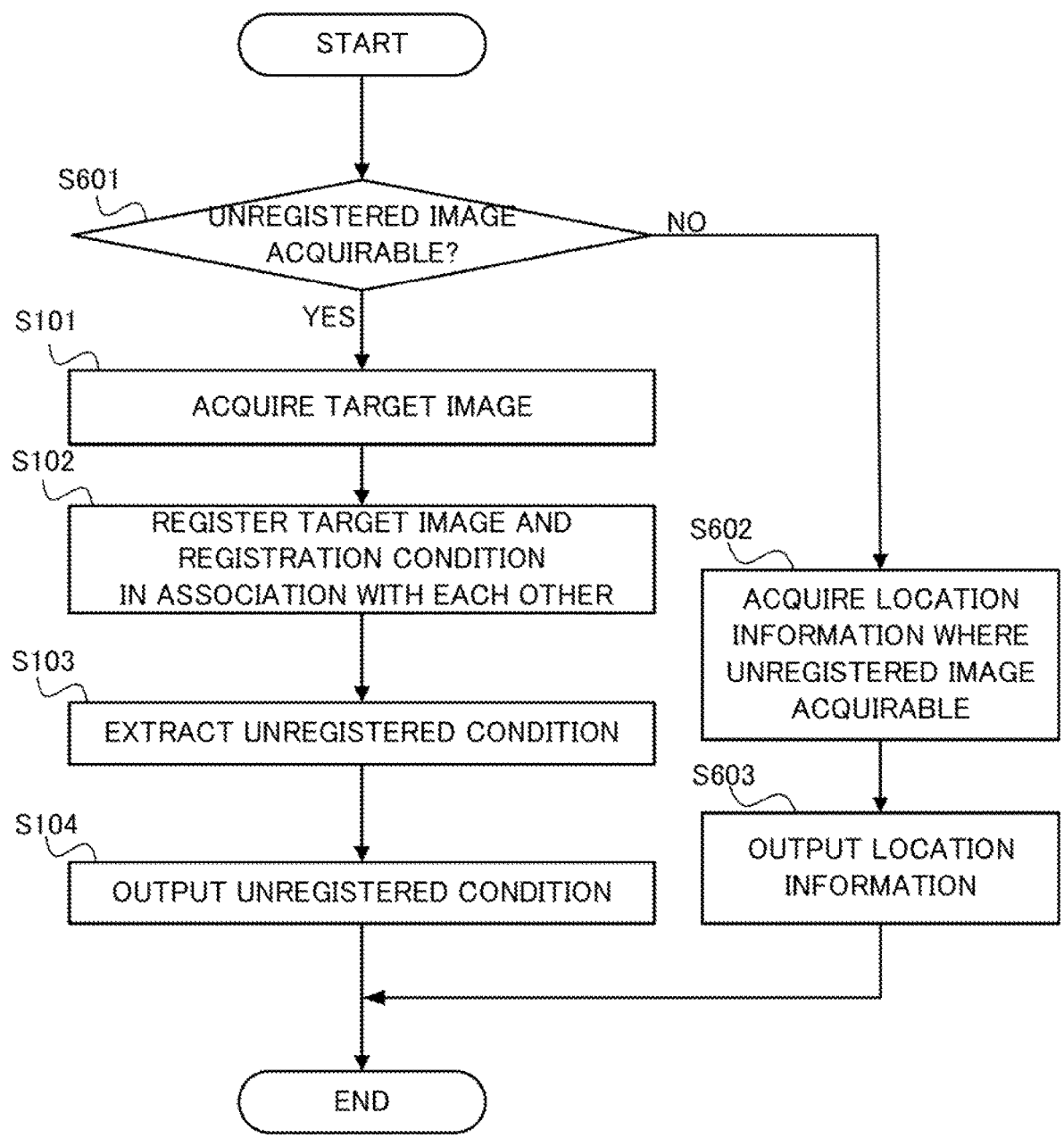
FIG. 23 is a flowchart showing a flow of operation by an information processing system according to the sixth example embodiment.

As shown in FIG. 23, when the information processing system 10 according to the sixth example embodiment operates, first, the acquisition-availability determination unit 170 determines whether or not the unregistered image is acquirable at the current location (step S601).

If it is determined that the unregistered image is acquirable at the current location (step S601: YES), the image acquisition unit 110 acquires the image of target (step S101). Thereafter, the registration unit 120 registers in the registration-image storage unit 122, the image of target acquired by the image acquisition unit 110 and the corresponding registration condition in association with each other (step S102). Then, the unregistered-condition output unit 130 extracts the unregistered condition that is unregistered in the registration unit 120 (step S103) and outputs the information relating to the unregistered condition (step S104).

On the other hand, when it is determined that the unregistered image is not acquirable at the current location (Step S601: NO), the location-information output unit 180 acquires the information of the location where the unregistered image is acquirable (step S602). Then, the location-information output unit 180 outputs the acquired information of the location where the unregistered image is acquirable (step S603).

(Output Example of Location Information)

Figure 24:
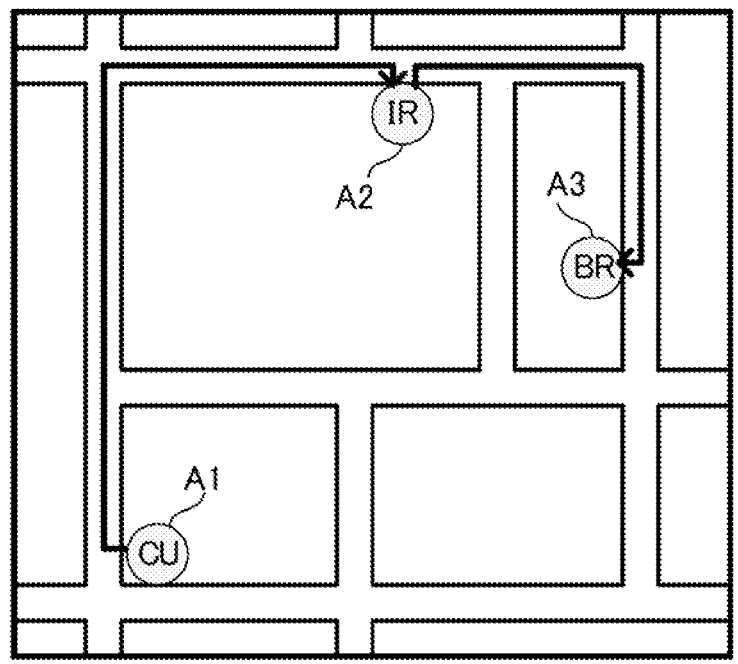
FIG. 24 is a plan view showing a display example of location information by an information processing system according to the sixth example embodiment.

Next, with reference to FIG. 24, an output example of the location information by the information processing system 10 according to the sixth example embodiment will be specifically described. FIG. 24 is a plan view showing a display example of the location information by the information processing system according to the sixth example embodiment.

As shown in FIG. 24, the location information of the location where the unregistered image is acquirable may be displayed as the map information. Such map information may be displayed on a display as a user interface (UI) provided by the system, or may be displayed on a display of a terminal (e.g., a smartphone, etc.) owned by the target. When displayed on the terminal owned by the target, the target can confirm the display while moving.

In the example shown in FIG. 24, displayed on the map are: the "CU" mark indicating the position of the current location A1; the "IR" mark indicating the position of the location A2 capable of taking an iris image (e.g., a relatively high resolution near-infrared image); and the "BR" mark indicating the position of the location A3 capable of taking an image brighter than the current location. When displaying such map information, the location-information output unit 180 may display the route information from the current location to the location where the unregistered image is acquirable. Further, in the case that visiting a plurality of locations is necessary, the route for visiting the locations efficiently (e.g., the route of the shortest traveling distance) may be displayed. Here, the shortest route from the current location A1 up to the location A2 where the iris image can be taken and the shortest route from the location A2 where the iris image can be taken up to the location A3 where the bright image can be taken are displayed. Although not shown here, a congestion situation may be displayed with respect to each location.

Technical Effects

Next, a description will be given technical effects obtained by the information processing system according to the sixth example embodiment.

As described in FIGS. 22 to 24, in the information processing system 10 according to the sixth example embodiment, in addition to the information relating to unregistered condition, the information relating to the location where the image corresponding to the unregistered condition is acquirable is output. In this way, even if the unregistered image is not acquirable at the current location, the user can acquire the unregistered image appropriately by guiding the target to the location where the unregistered image is acquirable. This also improves user convenience. The technical effects according to the present example embodiment are performed remarkably, when it is difficult to acquire all images, each corresponding to each registration condition, at a single location (e.g., the case that imaging in a different environment is required, etc.).

Seventh Example Embodiment

The information processing system 10 according to a seventh example embodiment will be described with reference to FIGS. 25 to 28. the seventh example embodiment differs only in a part of the configuration and operation of the first to sixth example embodiments described above, and the other parts may be the same as those of the first to sixth example embodiments. Therefore, the part that differs from the example embodiments described above will be described in detail below, and the other overlapping parts will not be described as appropriate.

(Functional Configuration)

Figure 25:
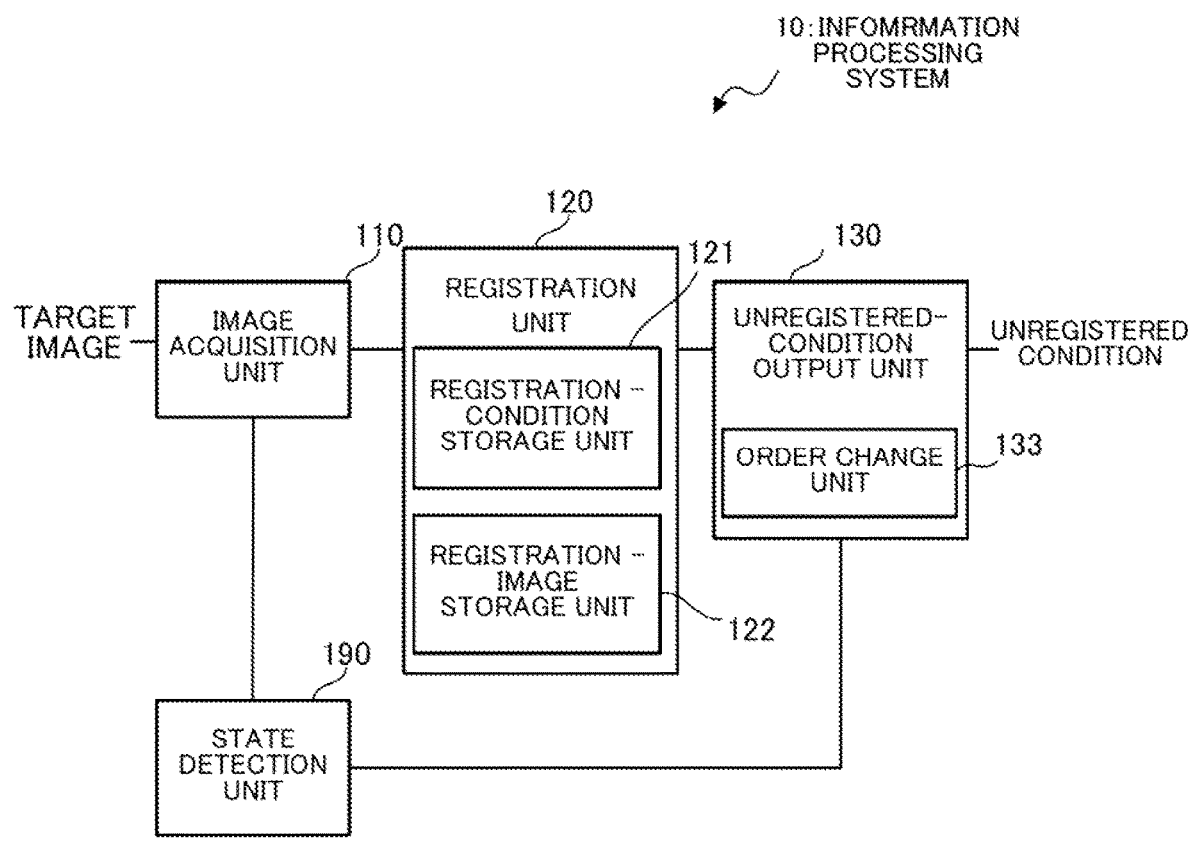
FIG. 25 is a block diagram showing a functional configuration of an information processing system according to the seventh example embodiment.

First, a functional configuration of the information processing system 10 according to the seventh example embodiment will be described with reference to FIG. 25. FIG. 25 is a block diagram showing the functional configuration of the information processing system according to the seventh example embodiment. In FIG. 25, the reference signs same in FIG. 2 are given to the components similar to in FIG. 2 respectively.

As shown in FIG. 25, the information processing system 10 according to the seventh example embodiment is configured to comprise an image acquisition unit 110, a registration unit 120, an unregistered-condition output unit 130, and a state detection unit 190 as components for realizing the functions of the information processing system 10. That is, the information processing system according to the seventh example embodiment is configured to comprise, in addition to the configuration of the first example embodiment (see FIG. 2), the state detection unit 190. The state detection unit 190 may be, for example, a processing block implemented by the processor 11 described above (see FIG. 1). Further, the unregistered-condition output unit 130 according to the seventh example embodiment comprises, in particular, an order change unit 133.

The state detection unit 190 is configured so as to detect the present state of the target (hereinafter, referred to as the "target state" as appropriate). The target condition may relate, for example, to a wearing state of a wearing item. More specifically, the target condition may be information of indicating whether or not the target currently wears a mask or eyeglasses. The state detection unit 190 may be configured so as to detect the target state from the image of target acquired by the image acquisition unit 110. The state detection unit 190 is configured to output the detected target condition to the order change unit 133.

The order change unit 133 may be configured so as to change the order (the output order) of the information relating to the unregistered condition to be outputted by the unregistered-condition output unit 130, based on the target state detected by the state detection unit 190. The unregistered-condition output unit 130 according to the seventh example embodiment is configured to, when there are a plurality of unregistered conditions, output the unregistered conditions one by one in order. The unregistered-condition output unit 130 outputs the information relating to unregistered conditions, for example, in order of priority described in the fifth example embodiment. Thus, although the output order of unregistered conditions is predetermined, the order change unit 133 may be configured so as to change the order. A specific example of changing the order by the order change unit 133 will be described in detail later.

(Flow of Operation)

Figure 26:
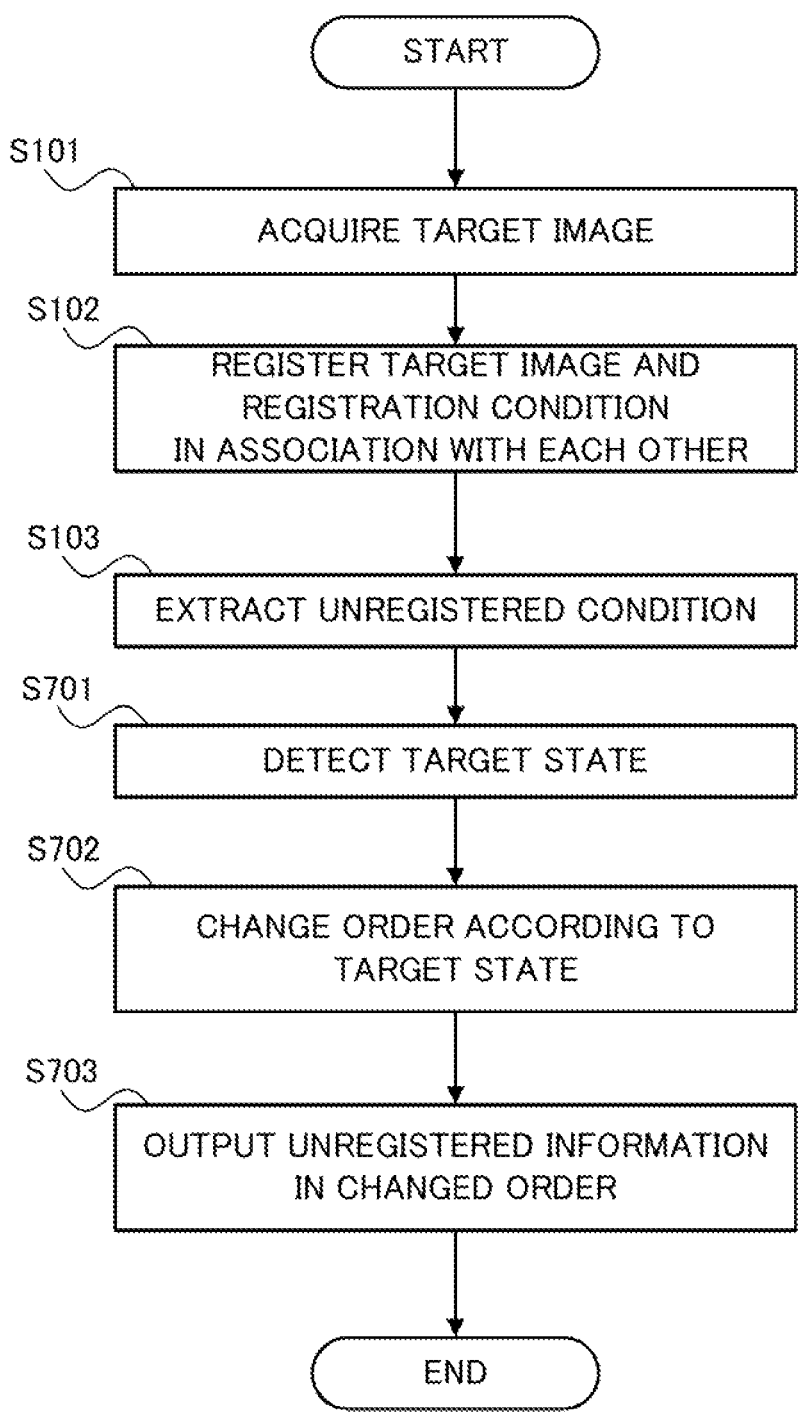
FIG. 26 is a flowchart showing a flow of operation by an information processing system according to the seventh example embodiment.

Next, referring to FIG. 26, a flow of operation by the information processing system 10 according to the seventh example embodiment will be described. FIG. 26 is a flowchart showing the flow of a concealed part changing operation by the information processing system according to the seventh example embodiment. in FIG. 26, the reference signs same in FIG. 3 are given to the processes similar to in FIG. 3 respectively.

As shown in FIG. 26, when the information processing system 10 according to the seventh example embodiment operates, first, the image acquisition unit 110 acquires the image of target (step S101). After that, the registration unit 120 registers in the registration-image storage unit 122, the image of target acquired by the image acquisition unit 110 and the corresponding registration condition in association with each other (step S102). Then, the unregistered-condition output unit 130 extracts the unregistered conditions that are unregistered in the registration unit 120 (step S103).

Subsequently, the status detection unit 190 detects the target state from the image of target (step S701). The processing for detecting the target state may be implemented immediately after the target image is acquired (i.e., immediately after step S101).

Subsequently, the order change unit 133 implements processing for changing the output order of the unregistered conditions based on the target state detected by the state detection unit 190 (step S702). Then, the unregistered-condition output unit 130 outputs the information relating to unregistered conditions in the output order changed (step S703).

(Example of Order Change)

Figure 27:
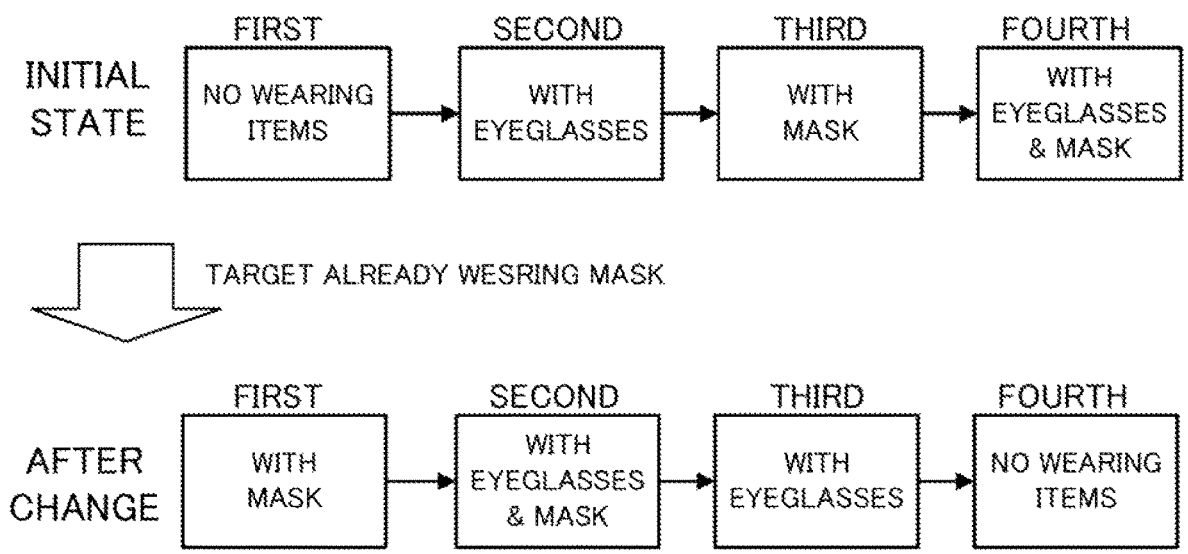
FIG. 27 is a conceptual diagram showing an example of changing the output order of unregistered conditions by an information processing system according to the seventh example embodiment.

Next, referring to FIG. 27, a method of changing the output order of the unregistered conditions by the information system 10 according to the seventh example embodiment will be described using a specific example. FIG. 27 is a conceptual diagram showing an example of changing the output order of unregistered conditions by the information processing system according to the seventh example embodiment.

In the example shown in FIG. 27, the output order in the initial state is set to this order: "no wearing items," "with eyeglasses," "with mask," and "with eyeglasses and mask." In other words, the image corresponding to "no wearing items" should be registered as the first one, the image corresponding to "with eyeglasses" should be registered as the second one, the image corresponding to "with mask" should be registered as the third one, and the image corresponding to "with eyeglasses and with mask" should be registered as the fourth one.

Here, when it is detected that the target is already wearing the mask, the order change unit 133 changes the output order in the order of "with mask", "with eyeglasses and with mask", "with eyeglasses" and "no wearing items". That is, the output order is changed in such as way: the image corresponding to "with mask" should be registered as the first one, the image corresponding to "with eyeglasses and with mask" should be registered as the second one, the image corresponding to "with eyeglasses" should be registered as the third one, and the image corresponding to "no wearing items" should be registered as the fourth one. Thereby, with respect to the image corresponding to "with mask" set as the first one, the target can take his/her image as he/she is (i.e., in the state of wearing the mask). With respect to the image corresponding to "with eyeglasses and mask" set as the second one, the target can take the image only by further putting eyeglasses on him/her. With respect to the image corresponding to "with eyeglasses" set as the third one, the target can take the image only by simply removing the mask. With respect to the image corresponding to "no wearing items" set as the fourth one, the target can take the image only by simply removing the eyeglasses.

As described above, it is possible to minimize trouble for the target to put on and remove wearing items, by changing the output order of unregistered conditions according to the target state.

(Method of Calculating Trouble)

Next, referring to FIG. 28, minimization of the trouble by the information system 10 according to the seventh example embodiment will be described using a specific example. FIG. 28 is a table showing a setting example of required time for each motion of the target in the information processing system according to the seventh example embodiment.

As shown in FIG. 28, the trouble because of putting on and removing wearing item may be quantified as the required time. Here, the required time for putting on the eyeglasses is set to 5 seconds, the required time for removing the eyeglasses is set to 6 seconds, the required time for putting on the mask is set to 8 seconds, and the required time for removing the mask is set to 10 seconds. The required time here is just one example, and the required time may be set to an optimum value as appropriate.

The order change unit 133 may change the order in such a way so as to make the total of the required time to register all images shortest using the required time described above. In this way, it is possible to grasp the trouble of target quantitatively to appropriately minimize the trouble.

In the above case of the eyeglasses and the mask, a difference with respect to the required time between the motions is only a few seconds. However, for example, with respect to clothes that cover most of a face such as burqa, niqab, and hijab used by Islamists, it is sometimes required to take an image without such clothes. In such cases, the required time for putting on and removing the clothes would increase. Therefore, the required time would fluctuate greatly depending on the output order of unregistered conditions.

Technical Effects

Next, technical effects obtained by the information processing system 10 according to the seventh example embodiment will be described.

As described in FIGS. 25 to 28, in the information processing system 10 according to the seventh example embodiment, the order of outputting the information relating to unregistered conditions is changed based on the state of a target. Thereby, it is possible to suppress that the trouble (e.g., the trouble for putting on and taking off wearing items) is increased, when the images corresponding to a plurality of registration conditions respectively are taken.

Also included in the scope of each example embodiment is a processing method comprising the steps of: recording in a recording medium, a computer program to operate the configuration of each above-mentioned example embodiment so as to realize the functions of each example embodiment; reading out the computer program recorded in the recording medium as code; and executing the computer program in a computer. In other words, a computer-readable recording medium is also included in the scope of each example embodiment. In addition, not only the recording medium where the above-mentioned computer program is recorded but also the computer program itself is included in each embodiment.

For example, a floppy disk (registered trademark), a hard disk, an optical disk, an optical magnetic disk, a CD-ROM, a magnetic tape, a non-volatile memory cards and a ROM can be each used as the recording medium. In addition, not only the computer program recorded on the recording medium that executes processing by itself, but also the computer program that operates on an OS to execute processing in cooperation with other software and/or expansion board functions is included in the scope of each embodiment. Further, the computer program may be stored in a server so that a part or all of the computer program can be downloaded from the server to a user terminal.

SUPPLEMENTARY NOTE

With respect to the example embodiments described above, they may be further described as supplementary notes below, but are not limited to the following.

Supplementary Note 1

The information processing system described as a supplementary note 1 is an information processing system comprising: an acquisition unit that acquires an image of a target; a registration unit that registers the image of the target and a registration condition including a condition relating to each wearing item of the target in association with each other; and an output unit that outputs information relating to, within the registration conditions to be registered with respect to the target, the registration condition that is unregistered in the registration unit.

Supplementary Note 2

The information processing system described as the supplementary note 2 is the information processing system according to the supplementary note 1, further comprising a determination unit that determines the registration condition that is acquirable from the target, wherein the output unit outputs information indicating which the registration condition is registered or unregistered, on a position corresponding to the registration condition of the target in a superimposed display manner, based on a determination result of the determination unit.

Supplementary Note 3

The information processing system described as a supplementary note 3 is the information processing system according to the supplementary note 1 or 2, further comprising a computing unit that calculates a similarity degree between: the image of the target; and a registered image that is registered in the registration unit, wherein the registration unit newly registers the image of the target in association with the registration condition, in a case that the registered image having the similarity degree that is equal to or greater than a predetermined value does not exist; and the output unit outputs in a superimposed display manner, information indicating that the registration condition has been newly registered on a position corresponding to the registration condition newly registered with respect to the target.

Supplementary Note 4

The information processing system described as a supplementary note 4 is the information processing system according to any one of the supplementary notes 1 to 3, wherein the registration condition includes a first condition relating to the wearing item of the target and a second condition relating to at least one of a line-of-sight orientation and a face orientation with respect to the target, and the registration unit newly registers the image of the target in associa-

Supplementary Note 5

The information processing system described as a supplementary note 5 is the information processing system according to any one of the supplementary notes 1 to 4, further comprising a setting unit that sets priority for each of the registration condition with respect to each type of the image of the target, wherein the output unit outputs according to the priority, the information relating to the registration information that is unregistered in the registration unit.

Supplementary Note 6

The information processing system described as a supplementary note 6 is the information processing system according to any one of the supplementary notes 1 to 5, further comprising a location output unit that, in a case that an unregistered image is not acquirable at a current location, the unregistered image being the image of the target corresponding to the registration condition being unregistered in the registration unit, outputs information relating to a location where the unregistered image is acquirable.

Supplementary Note 7

The information processing system described as a supplementary note 7 is the information processing system according to any one of the supplementary notes 1 to 6, further comprising a detection unit that detects from the image of the target, a state relating to the registration condition with respect to the target, wherein the output unit changes an order of outputting the information relating to the registration information that is unregistered in the registration unit, based on a detection result of the detection unit.

Supplementary Note 8

The information processing apparatus described as a supplementary note 8 is an information processing apparatus comprising: an acquisition unit that acquires an image of a target; a registration unit that registers the image of the target and a registration condition including a condition relating to each wearing item of the target in association with each other; and an output unit that outputs information relating to, within the registration conditions to be registered with respect to the target, the registration condition that is unregistered in the registration unit.

Supplementary Note 9

The information processing method described as a supplementary note 9 is an information processing method to be implemented by at least one computer, comprising: acquiring an image of a target; registering the image of the target and a registration condition including a condition relating to each wearing item of the target in association with each other; and outputting information relating to, within the registration conditions to be registered with respect to the target, the registration condition that is unregistered in the registration unit.

Supplementary Note 10

The recording medium described as a supplementary note 10 is a recording medium storing a computer program that allows at least one computer to implement an information processing method, the information processing method comprising: acquiring an image of a target; registering the image of the target and a registration condition including a condition relating to each wearing item of the target in association with each other; and outputting information relating to, within the registration conditions to be registered with respect to the target, the registration condition that is unregistered in the registration unit.

Supplementary Note 11

The computer program described as a supplementary note 11 is a computer program that allows at least one computer to implement an information processing method, the information processing method comprising: acquiring an image of a target; registering the image of the target and a registration condition including a condition relating to each wearing item of the target in association with each other; and outputting information relating to, within the registration conditions to be registered with respect to the target, the registration condition that is unregistered in the registration unit.

This disclosure is not limited to the above example embodiments. This disclosure can be modified as necessary to the extent that does not contradict the concept or idea of the invention which can be read from the entire claims and the entire description; and information processing systems, information processing apparatuses, information processing methods, and recording media with such changes are also included in the technical concept of this disclosure.

DESCRIPTION OF REFERENCE SIGNS

10 Information processing system
11 Processor
18 Camera
50 Target
60 Mask
70 Eyeglasses
110 Image acquisition unit
120 Registration unit
121 Registration-condition storage unit
122 Registration-image storage unit
123 Combination determination unit
130 Unregistered-condition output unit
131 First superimposed display unit
132 Second superimposed display unit
133 Order change unit
140 Condition determination unit
150 Similarity computing unit
160 Priority setting unit
170 Acquisition-availability determination unit
180 Location-information output unit
190 State detection unit

What is claimed is:
1. An information processing system comprising:
a camera that acquires an image of a target;
a superimposing display;
a registration module;
at least one memory configured to store instructions; and
at least one processor configured to implement the instructions to:
acquire the image of the target using the camera;
determine a condition that is acquirable from the target;
indicate whether the condition is registered or unregistered by superimposing a registration status on the display at a position corresponding to the condition based on a registration status determination of the registration module; and use the registration module to register in the at least one memory, the image of the target and information relating to an item worn by the target; and output information relating to an unregistered condition in the at least one memory.

2. The information processing system according to claim 1, further comprising a user input corresponding to a predetermined value; wherein the at least one processor is configured to implement the instructions to calculate a similarity degree between: the image of the target; and a registered image that is registered in the at least one memory, using the registration module, register the image of the target if the similarity degree is equal to or greater than the predetermined value; and output on the superimposing display, at a position corresponding to the condition, information indicating that the condition has been newly registered with respect to the target.

3. The information processing system according to claim 1, wherein the condition includes a first sub-condition relating to the item worn by the target and a second sub-condition relating to at least one of a line-of-sight orientation or a facial orientation of the target with respect to the camera, and the at least one processor is configured to implement the instructions to using the registration module, newly register the image of the target in association with the condition, in the case that both of the first and second sub-conditions are unregistered.

4. The information processing system according to claim 1, wherein the at least one processor is configured to implement the instructions to in the at least one memory, set a priority for the unregistered, and output according to the priority, on the superimposing display at a position corresponding to the unregistered condition, information relating to the condition that is unregistered in the at least one memory.

5. The information processing system according to claim 1, wherein the at least one processor is configured to implement the instructions to in a case that an unregistered image is not acquirable using the camera at a current location, the unregistered image being the image of the target corresponding to the unregistered condition, output on the superimposing display information relating to a location where the unregistered image is acquirable.

6. The information processing system according to claim 1, wherein the at least one processor is configured to implement the instructions to detect from the image of the target, a state relating to the unregistered condition of the target, and change an order of outputting on the superimposing display the information relating to the unregistered condition based on a the state.

7. An information processing method to be implemented by at least one computer having at least one memory, comprising:

acquiring an image of a target using a camera;

determining a condition that is acquirable from the target;

indicating whether the condition is registered or unregistered by superimposing a registration status on a display at a position corresponding to the condition based on a registration status determination of a registration module; and using the registration module to register in the at least one memory, the image of the target and information relating to an item worn by the target; and outputting information relating to an unregistered condition in the at least one memory.

8. A non-transitory recording medium storing a computer program that allows at least one computer having at least one memory to implement an information processing method, the information processing method comprising:

acquiring an image of a target using a camera;

determining a condition that is acquirable from the target;

indicating whether the condition is registered or unregistered by superimposing a registration status on a display at a position corresponding to the condition based on a registration status determination of a registration module; and using the registration module to register in the at least one memory, the image of the target and information relating to an item worn by the target; and outputting information relating to an unregistered condition in the at least one memory.

* * * * *